US011270131B2

(12) United States Patent
Sugie et al.

(10) Patent No.: US 11,270,131 B2
(45) Date of Patent: Mar. 8, 2022

(54) MAP POINTS-OF-CHANGE DETECTION DEVICE

(71) Applicant: DENSO CORPORATION, Kariya (JP)

(72) Inventors: Maiko Sugie, Kariya (JP); Yasuyuki Ito, Kariya (JP); Hiroyuki Kitagawa, Kariya (JP); Satoru Nomura, Yokohama (JP); Tomoharu Murate, Yokohama (JP); Miyo Hamada, Yokohama (JP)

(73) Assignee: DENSO CORPORATION, Kariya (JP)

( * ) Notice: Subject to any disclaimer, the term of this patent is extended or adjusted under 35 U.S.C. 154(b) by 65 days.

(21) Appl. No.: 16/682,538

(22) Filed: Nov. 13, 2019

(65) Prior Publication Data
US 2020/0082179 A1 Mar. 12, 2020

Related U.S. Application Data

(63) Continuation of application No. PCT/JP2018/018296, filed on May 11, 2018.

(30) Foreign Application Priority Data

Jun. 9, 2017 (JP) .............................. JP2017-114572
Feb. 8, 2018 (JP) .............................. JP2018-021191

(51) Int. Cl.
*G06K 9/00* (2006.01)
*B60R 1/00* (2006.01)
(Continued)

(52) U.S. Cl.
CPC ............ *G06K 9/00798* (2013.01); *B60R 1/00* (2013.01); *G01C 21/32* (2013.01);
(Continued)

(58) Field of Classification Search
CPC ................ B60R 1/00; B60R 2300/105; B60R 2300/305; B60R 2300/605;
(Continued)

(56) References Cited

U.S. PATENT DOCUMENTS 9,240,055 B1 * 1/2016 Liu .......................... G06T 5/005
2014/0163717 A1 * 6/2014 Das .......................... G01J 5/004
700/119

(Continued)

FOREIGN PATENT DOCUMENTS

JP 2000230834 A 8/2000
JP 3366135 B2 1/2003
(Continued)

OTHER PUBLICATIONS

Machine translation of JP 2009069900 A (Year: 2009).*
(Continued)

*Primary Examiner* — Christopher S Kelley
*Assistant Examiner* — Ana Picon-Feliciano
(74) *Attorney, Agent, or Firm* — Harness, Dickey & Pierce, P.L.C.

(57) ABSTRACT

A map points-of-change detection device includes: a camera capturing an image of an area around a vehicle; a bird's-eye-view transformation section transforming the image into a bird's-eye view image; a map storage portion storing a road map including a road surface map; a collation processing section determining whether a point of change in the road surface map exits, the point of change being a position at which a change has occurred on an actual road surface; and a collation region identification section that determines a region for collation in a width direction of the vehicle from the bird's-eye view image.

13 Claims, 24 Drawing Sheets

(51) Int. Cl.
*G01C 21/32* (2006.01)
*G06T 5/00* (2006.01)

(52) U.S. Cl.
CPC .......... *G06K 9/00825* (2013.01); *G06T 5/006* (2013.01); *B60R 2300/105* (2013.01); *B60R 2300/305* (2013.01); *B60R 2300/605* (2013.01); *B60R 2300/607* (2013.01)

(58) Field of Classification Search
CPC ........ B60R 2300/607; B60R 2300/804; G01C 21/32; G01C 21/3602; G06K 9/00791; G06K 9/00798; G06K 9/00825; G06T 2207/30256; G06T 5/006; G06T 7/254
USPC ......................................................... 348/148
See application file for complete search history.

(56) References Cited

U.S. PATENT DOCUMENTS

| | | | | |
|---|---|---|---|---|
| 2015/0049193 A1* | 2/2015 | Gupta | .................... | G03B 43/00 348/148 |
| 2017/0008521 A1* | 1/2017 | Braunstein | ......... | G06K 9/00791 |
| 2017/0151910 A1* | 6/2017 | Sato | .......................... | B60R 1/00 |

FOREIGN PATENT DOCUMENTS

| | | | | |
|---|---|---|---|---|
| JP | 2007218705 A | | | 8/2007 |
| JP | 2009069900 A | * | | 4/2009 |
| JP | 2009212734 A | | | 9/2009 |
| JP | 2016142604 A | | | 8/2016 |
| JP | 2016180797 A | | | 10/2016 |
| JP | 2016196217 A | * | | 11/2016 |
| WO | WO-2017208503 A1 | | | 12/2017 |

OTHER PUBLICATIONS

Machine translation of JP 2016196217 A (Year: 2016).*
R. Hussin, M. Rizon Juhari, Ng Wei Kang, R.C. Ismail, A. Kamarudin,Digital Image Processing Techniques for Object Detection From Complex Background Image,Procedia Engineering, vol. 41, 2012, pp. 340-344,ISSN 1877-7058, https://doi.org/10.1016/j.proeng.2012.07.182. (Year: 2012).*
"Human-Area Segmentation Using Chamfer Matching by Selecting Similar Silhouette Images Based on Weak-Classifier Response," Murai, Yosuke et al., Jun. 2, 2018 (partial translation).

* cited by examiner

FORWARD VIEW IMAGE (INPUT IMAGE)

CORRECTED FORWARD VIEW IMAGE

Y, φ : POLAR COORDINATES
u, v : ORTHOGONAL COORDINATES

FORWARD VIEW IMAGE (INPUT IMAGE)

DISTORTION CORRECTION IMAGE

BEFORE CORRECTION (AFTER DISTORTION CORRECTION)

AFTER VOLUME DISTORTION CORRECTION

BIRD'S-EYE VIEW IMAGE

AFTER REMOVAL OF OBSTACLE

I   SUM OF PIXEL VALUES WITHIN RANGE OF ASSUMED WHITE LINE WIDTH S
II  SUM OF PIXEL VALUES OUTSIDE ASSUMED WHITE LINE WIDTH ON THE LEFT
III SUM OF PIXEL VALUES OUTSIDE ASSUMED WHITE LINE WIDTH ON THE RIGHT

G : WHITE LINE INTENSITY
S : ASSUMED WHITE LINE WIDTH

FIG. 16

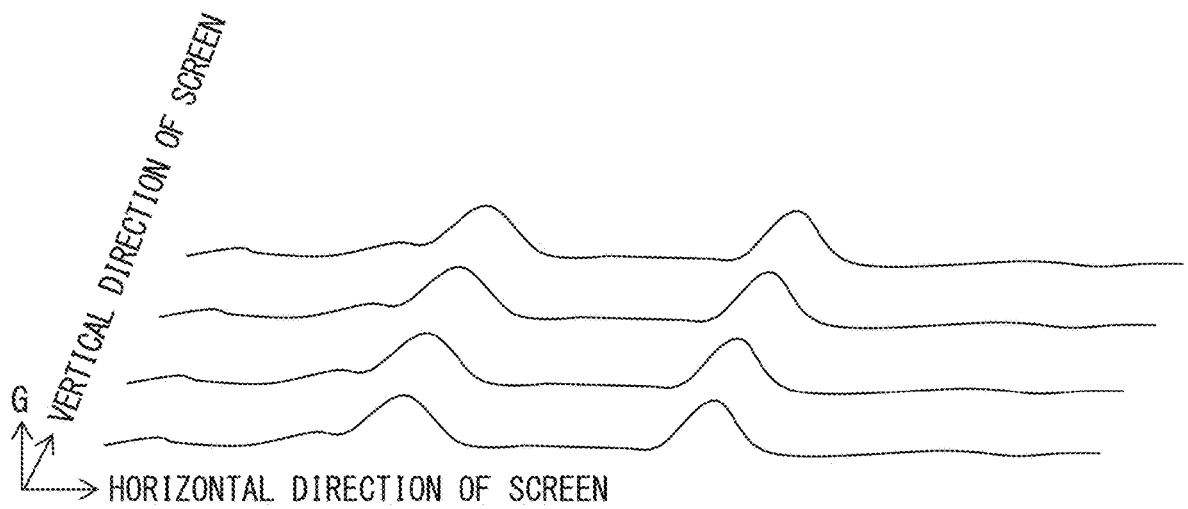

FIG. 17

| SECOND LINE ON THE LEFT | FIRST LINE ON THE LEFT | FIRST LINE ON THE RIGHT | SECOND LINE ON THE RIGHT | TRAVEL LANE |
|---|---|---|---|---|
| — | SOLID LINE | DASHED LINE | — | TRAVELING IN LEFT LANE OF TWO LANES |
| — | DASHED LINE | SOLID LINE | — | TRAVELING IN RIGHT LANE OF TWO LANES |
| — | DASHED LINE | DASHED LINE | — | TRAVELING IN MIDDLE LANE OF THREE LANES |
| SOLID LINE OR DASHED LINE | SOLID LINE | SOLID LINE | SOLID LINE OR DASHED LINE | TRAVELING IN MIDDLE LANE OF THREE LANES |
| NONE | SOLID LINE | SOLID LINE | NONE | UNKNOWN |

HIGH PRECISION MAP (ORIGINAL IMAGE)

HIGH PRECISION MAP (DISTANCE TRANSFORMATION IMAGE)

FIG. 21
LANE LINE
IN HIGH PRECISION MAP
— — — —
LANE LINE
IN WHITE LINE INTENSITY IMAGE
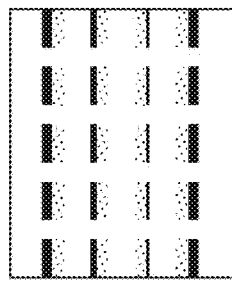  SCALE WHITE LINE INTENSITY IMAGE 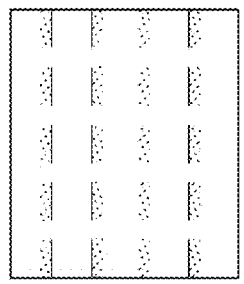
FIG. 22
LANE LINE
IN HIGH PRECISION MAP
— — — —
LANE LINE
IN WHITE LINE INTENSITY IMAGE
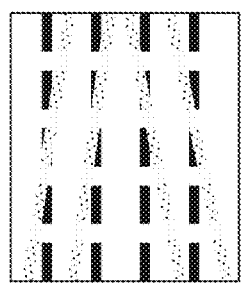  PROJECTIVE TRANSFORMATION OF WHITE LINE INTENSITY IMAGE 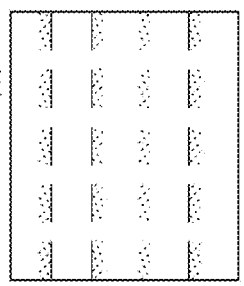

[CAMERA SIDE]

[CAMERA SIDE]

PITCH CORRECTION IS NOT PERFORMED

PITCH CORRECTION IS PERFORMED

MAP POINTS-OF-CHANGE DETECTION DEVICE

CROSS REFERENCE TO RELATED APPLICATIONS

The present application is a continuation application of International Patent Application No. PCT/JP2018/018296 filed on May 11, 2018 which designated the U. S. and claims the benefit of priority from Japanese Patent Application No. 2017-114572 filed on Jun. 9, 2017 and Japanese Patent Application No. 2018-021191 filed on Feb. 8, 2018. The entire disclosures of all of the above applications are incorporated herein by reference.

TECHNICAL FIELD

The present disclosure relates to a map points-of-change detection device that detects a point of change of a road map.

BACKGROUND

A technique for measuring a white line position with high accuracy by running a measurement truck has been known.

SUMMARY

The present disclosure describes a map points-of-change detection device includes a camera, a bird's-eye-view transformation section that transforms the image into a bird's-eye view image, a map storage portion, and a collation processing section that determines whether a point of change in the road surface map exits by collating the bird's-eye view image with a road surface map.

BRIEF DESCRIPTION OF DRAWINGS

Objects, features and advantages of the present disclosure will become more apparent from the following detailed description made with reference to the accompanying drawings. In the drawings:

FIG. 16 is a diagram describing a method for detecting a center of a white line from the white line intensity;
FIG. 17 is a diagram showing a relationship between a detected line segment pattern and a travel lane;
FIG. 21 is a diagram showing a scaling process performed in S22 in FIG. 18;
FIG. 22 is a diagram showing projective transformation performed in S22 in FIG. 18.

DETAILED DESCRIPTION

Figure 1:
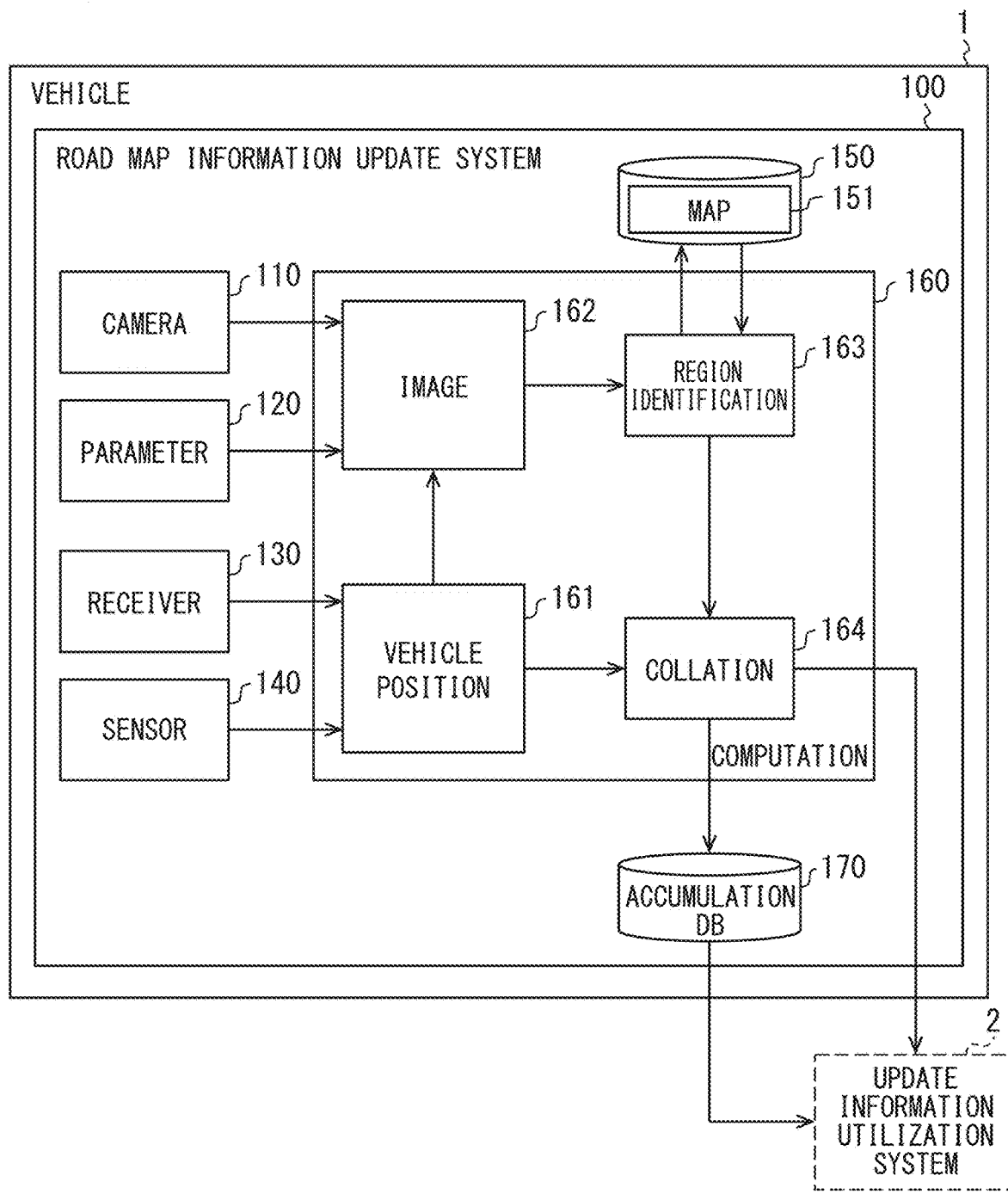
FIG. 1 is a block diagram showing a configuration of a road map information update system according to a first embodiment.

There has been known a technique for measuring a white line position with high accuracy by running a measurement truck. A measurement truck may include an odometry device, three GPSs (Global Positioning Systems), three gyro sensors, a laser radar, a camera, and a computer. The white line position measured by the measurement truck may be used for a high precision map. Road markings such as white lines are drawn precisely on the high precision map. Top view transformation has been known.

The inventors of this application have been found followings. A new road may open. If a new road is opened, the high precision map also needs to be updated. In addition, existing roads may also have changes that require updating the high precision map. Examples of such changes include a case where the rightmost lane is changed to a right-turn only lane.

It may be preferable that the high precision map is updated promptly in response to actual road changes. In the following, the position of the actual road at which some changes occur with respect to the road indicated in the high precision map is referred to as a point of change.

The point of change can be detected by running the measurement truck frequently and comparing the created high precision map with the map obtained by the measurement performed by the measurement truck. The measurement truck may be expensive because it includes the various devices described above, and it may be difficult to prepare a lot of measurement trucks and run these trucks frequently on various roads. It may be difficult to promptly detect a point of change using the measurement truck.

General vehicles are increasingly equipped with devices having cameras, such as drive recorders. Therefore, it may be considered to detect a point of change using images captured by cameras mounted on general vehicles. It may not be easy to detect a point of change using images captured by cameras mounted on general vehicles.

A road included in an image captured by a camera appears narrower as it is farther from a viewer, even though the road actually has a constant width. Therefore, the image captured by the camera may not simply be collated with the image of the road part included in the high precision map.

In addition, a camera mounted on a general vehicle may be provided to capture an obstacle present around the vehicle on which the camera is mounted, such as other vehicles. The image captured by the camera naturally may include various obstacles that are not on the road surface. In order to detect the point of change with high accuracy, it may be preferable to remove an obstacle unnecessary for the detection of the point of change from the image captured by the camera.

The cameras mounted on general vehicles do not have a higher resolution than those mounted on measurement vehicles. Therefore, the obstacle may not be detected and removed with high accuracy from the image.

It may not be easy to detect points of change with high accuracy using images captured by low resolution cameras mounted on general vehicles.

The present disclosure describes a map points-of-change detection device capable of detecting a point of change with high accuracy, even when a low resolution camera is used.

According to one aspect of the present disclosure, a map points-of-change detection device includes: a camera that is provided in a vehicle and is configured to capture an image of an area around the vehicle; a bird's-eye-view transformation section that is configured to transform the image captured by the camera into a bird's-eye view image; a map storage portion that is configured to store a road map including a road surface map; and a collation processing section that is configured to determine whether a point of change in the road surface map exits by collating the bird's-eye view image with the road surface map, the point of change being a position at which a change has occurred on an actual road surface.

The map points-of-change detection device transforms an image of an area around the vehicle captured by a camera into a bird's-eye view image. Due to the transformation into a bird's-eye view image, an image can be obtained in which the road width is constant like the actual road, despite the distance from the vehicle. Further, due to the transformation into a bird's-eye view image, it may be possible to remove various objects present in a place other than a road surface, such as buildings and trees. The bird's-eye view image is used as an image to be collated with a road surface map, and it may be possible to detect a point of change with high accuracy even if the resolution is low.

Embodiments will be described with reference to the drawings. FIG. 1 is a block diagram showing the configuration of a road map information update system 100 having a function as a map points-of-change detection device.

(Overall Configuration)

The road map information update system 100 includes a camera 110, a parameter storage portion 120, a GPS receiver 130, a behavior detection sensor 140, a map storage portion 150, a computation portion 160, and an accumulated data storage portion 170. The road map information update system 100 is mounted on a vehicle 1.

Figure 3:
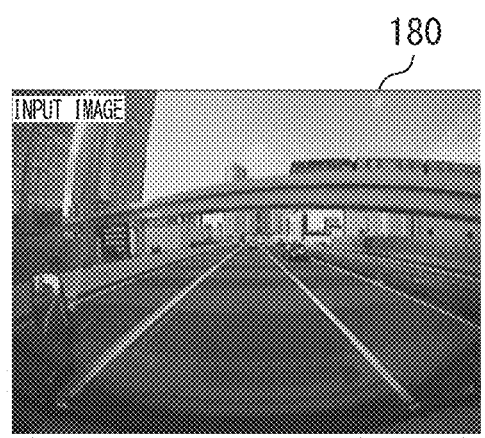
FIG. 3 is a view showing a forward view image captured by a camera.

The camera 110 is installed in a direction so that the area in front of the vehicle 1 can be captured, and captures an image of the area in front of the vehicle 1 in the surrounding areas of the vehicle 1. In the following description, an image captured by the camera 110 is referred to as a forward view image 180. FIG. 3 shows an example of the forward view image 180.

In the present embodiment, the camera 110 is included in a drive recorder. If the drive recorder is mounted on the vehicle 1, the road map information update system 100 does not need to have the camera 110 separately. Since the camera 110 is a component of the drive recorder, the camera 110 has a wide-angle lens, so that it has a wide angle of view.

The parameter storage portion 120 stores parameters of the camera 110 necessary for image processing. Specifically, the parameters include a focal length f of the camera 110, and a yaw angle rx and a tilt angle ry of an optical axis of the camera. The focal length f of the camera 110 is a value determined by each product, and is stored in advance in the parameter storage portion 120.

The yaw angle rx and the tilt angle ry of the optical axis of the camera vary according to the mounting position of the camera 110. In the present embodiment, the yaw angle rx and the tilt angle ry are calculated by analyzing the forward view image 180. Then, the calculation result is stored in the parameter storage portion 120. To enable storage of the calculation result, a writable storage portion is used for the parameter storage portion 120.

The GPS receiver 130 receives a navigation signal transmitted by a navigation satellite included in a GPS (Global Positioning System) which is one of the satellite navigation systems, and sequentially calculates the current position on the basis of the received navigation signal.

The behavior detection sensor 140 detects the attitude of the vehicle 1. Specific examples of the behavior detection sensor 140 include an acceleration sensor, a vehicle speed sensor, and a gyro sensor.

The map storage portion 150 stores a high precision map 151. The high precision map 151 is a map obtained through measurement by running a measurement truck, and indicates road markings such as traffic lane lines in detail like an image. The high precision map 151 also indicates, in detail, three-dimensional objects above the road surface, such as utility poles, guardrails, and road signs. For convenience of following description, the road surface area in the high precision map 151 is referred to as a road surface map below. Further, the high precision map 151 including the road surface map corresponds to a road map.

The computation portion 160 is a computer provided with a CPU, a ROM, a RAM, and the like. The CPU executes a program stored in a non-transitory tangible storage medium such as a ROM, while using a temporary storage function of the RAM. The computation portion 160 functions as a vehicle position detection section 161, an image processing section 162, a collation region identification section 163, and a collation processing section 164. When these functions are performed, a method corresponding to the program is performed.

A part or all of the functional blocks included in the computation portion 160 may be achieved using one or more ICs, etc. (in other words, achieved as hardware). Further, a part or all of the functional blocks included in the computation portion 160 may be achieved by a combination of software execution by the CPU and hardware members.

The accumulated data storage portion 170 is a storage that accumulates points of change detected by the process of the collation processing section 164 and road information related to the points of change. The point of change is a position at which a change has occurred on the actual road with respect to the road indicated in the high precision map 151. The road information related to a point of change is information indicating the specific type of the change occurring on the road at the point of change. For example, the road information related to a point of change includes the character of a road marking newly added to the road.

Processes of the respective sections of the computation portion 160 will be described.

(Process of Vehicle Position Detection Section)

The vehicle position detection section 161 sequentially detects the current position of the vehicle 1 by hybrid navigation achieved by combining satellite navigation and self-contained navigation. The satellite navigation is a method for estimating the current position on the basis of a signal supplied from the GPS receiver 130. The self-contained navigation is a method for detecting the relative trajectory of the vehicle position on the basis of the vehicle attitude detected by the behavior detection sensor 140. The present invention is not limited to use the hybrid navigation, and may sequentially detect the current position of the vehicle 1 only by satellite navigation. The vehicle position detection section 161 outputs the detected current position to the image processing section 162.

(Process of Image Processing Section)

Figure 2:
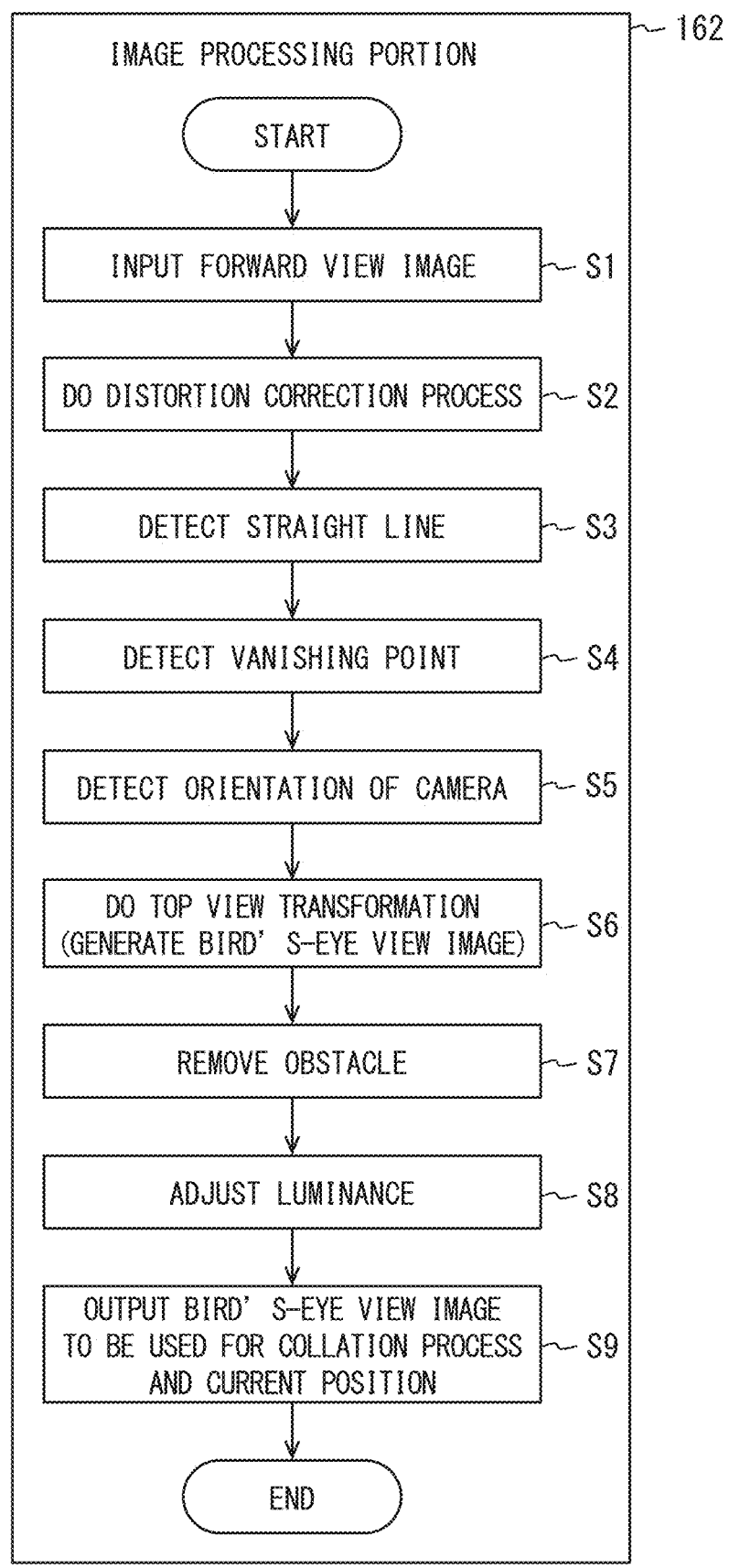
FIG. 2 is a flowchart showing a process executed by an image processing section in FIG. 1.

The image processing section 162 processes the forward view image 180 sequentially captured by the camera 110 to generate a bird's-eye view image. The process executed by the image processing section 162 will be described with reference to the flowchart shown in FIG. 2. The image processing section 162 periodically executes the process shown in FIG. 2 while the road map information update system 100 is activated.

In S1, the forward view image 180 captured by the camera 110 is input. In S2, a process for correcting distortion of the forward view image 180 input in S1 is performed to generate a corrected forward view image 181 illustrated in FIG. 4. S2 corresponds to a distortion correction processing section.

The forward view image 180 is greatly distorted because it is captured by a wide-angle lens. When the distortion is large, the detection accuracy of the point of change is reduced. Therefore, the distortion of the forward view image 180 is corrected. The distortion here is a phenomenon in which an image is captured as though it is being pulled toward the center according to the incident angle to the camera 110, and this phenomenon is referred to as distortion. When a wide-angle lens is used, a barrel-shaped image is obtained in which the image at edges is being pulled toward the center in the vertical direction or toward the center in the horizontal direction.

Figure 5:
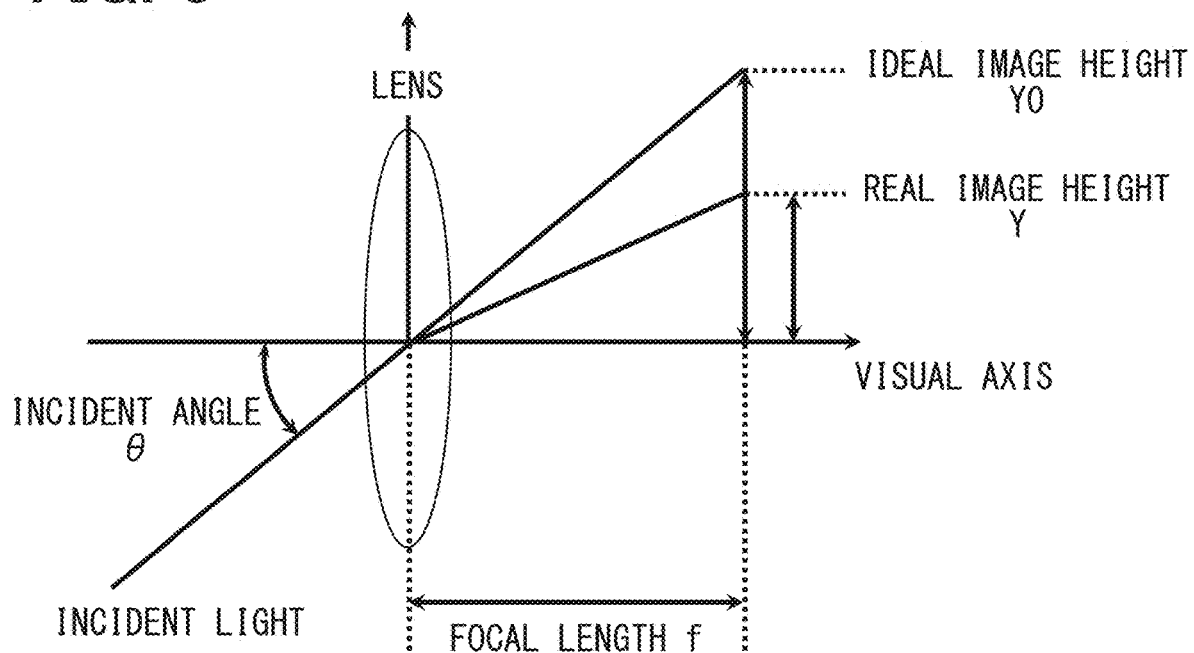
FIG. 5 is a diagram showing a relationship among a real image height, an ideal image height, an incident angle, and a focal length.

Image projection methods include orthographic projection and equidistant projection. Distortion correction process corresponding to the image projection method is performed. In the present embodiment, a distortion correction process corresponding to equidistant projection is performed. The equidistant projection relational equation is expressed by Equation 1. In Equation 1, Y is a real image height, Y0 is an ideal image, f is a focal length, and θ is an incident angle. FIG. 5 shows the relationship among the real image height Y, the ideal image height Y0, the incident angle θ, and the focal length f.

[Equation 1]

$$\begin{cases} Y = f\theta \\ Y0 = f\tan\theta \end{cases} \quad \text{(Equation 1)}$$

The orthogonal coordinates (u, v) of each point of the image before correction may be expressed by Equation 2 using the real image height Y and the angle φ in a polar coordinate system.

[Equation 2]

$$\begin{cases} u = Y\cos\varphi \\ v = Y\sin\varphi \end{cases} \quad \text{(Equation 2)}$$

Further, orthogonal coordinates (u0, v0) of the ideal image are represented by Equation 3.

[Equation 3]

$$\begin{cases} u0 = Y0\cos\varphi \\ v0 = Y0\sin\varphi \end{cases} \quad \text{(Equation 3)}$$

Figure 6:
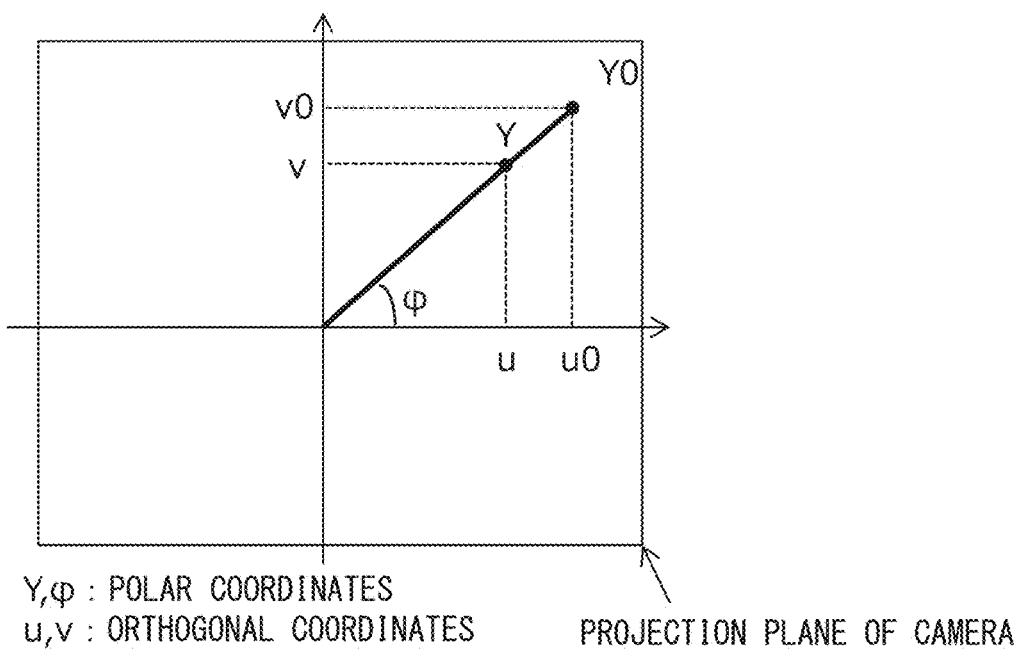
FIG. 6 is a diagram showing a relationship between points (u, v) of an image before correction and orthogonal coordinates (u0, v0) of an ideal image.

FIG. 6 shows the relationship among each point (u, v) of the image before correction, the orthogonal coordinates (u0, v0) of the ideal image, and the polar coordinates. In the distortion correction process, first, (u, v) are converted to polar coordinates (Y, φ) by Equation 2. Then, the polar coordinate Y is replaced with the ideal image height Y0 obtained from Equation 1. Then, orthogonal coordinates (u0, v0) are obtained from Equation 3.

Figure 7:
FIG. 7 is a view showing a forward view image.

An image obtained by the process so far is referred to as a distortion correction image 185. FIG. 7 shows a forward view image 180 different from that shown in FIG. 3, and FIG. 8 shows a distortion correction image 185 obtained by correcting the forward view image 180 shown in FIG. 7.

Figure 8:
FIG. 8 is a view showing a distortion correction image.

As understood from the relationship between Y and Y0 in FIG. 6, in the distortion correction image 185 shown in FIG. 8, three-dimensional objects at the edge of the image are extended toward the edge of the image. This is called a volume distortion image.

Figure 9:
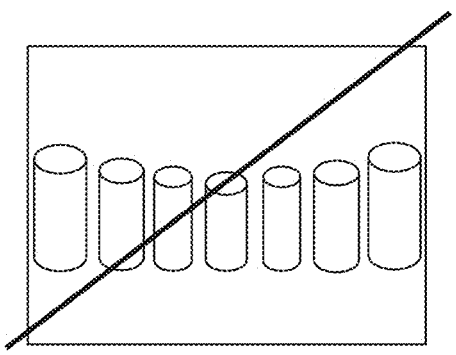
FIG. 9 is a view for describing an image before distortion correction.
Figure 10:
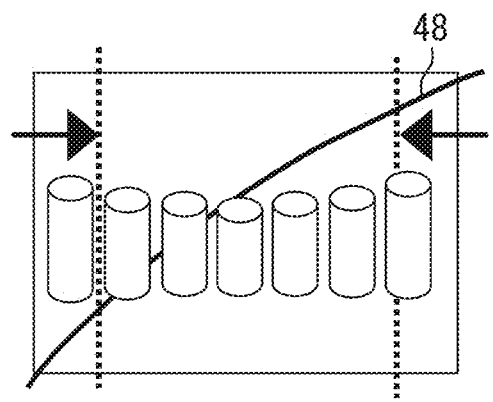
FIG. 10 is a view for describing an image after volume distortion correction.

In the distortion correction process, a process for correcting a volume distortion image is also performed. In order to correct the volume distortion image, non-linear transformation is performed for bringing the peripheral edge of the image closer to the center of the image, as shown in FIG. 10. This transformation is called volume distortion image correction. The volume distortion image correction indicates correction for transforming the straight line shown in FIG. 9 into a curve indicated by a line 48 in FIG. 10. Due to this correction, the size of the image in the horizontal direction is reduced to the size indicated by a dashed line in FIG. 10, and the reduction rate is higher at the left and right ends of the image.

Figure 4:
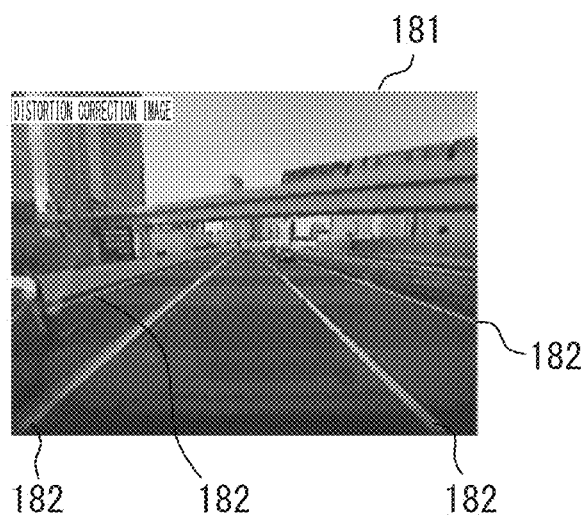
FIG. 4 is a view showing a corrected forward view image generated in S2 in FIG. 2.

An image obtained by performing the volume distortion image correction is illustrated in FIG. 4 as a corrected forward view image 181. In the corrected forward view image 181, roads and bridges have substantially straight lines, and the building at the edge of the image also appears upright.

In S3, a straight line is detected from the corrected forward view image 181. In order to detect a straight line, an edge detection process for detecting density of the image is performed. The detected edge is indicated by a set of points. Hough transform is performed on the set of edge points in order to detect a straight line such as a traffic lane line.

Figure 11A:
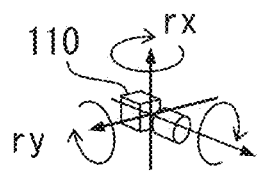
FIG. 11A is a diagram showing a relationship between a lane line and a vanishing point.
Figure 11B:
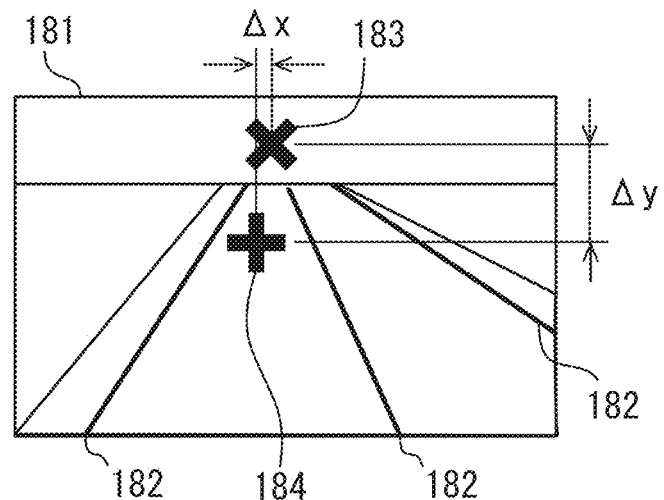
FIG. 11B is a view showing a relationship between a lane line and a vanishing point.

In S4, a vanishing point 183 in the corrected forward view image 181 is detected. S4 corresponds to a vanishing point detection section. In order to detect the vanishing point 183, parallel lines extending near the center in the corrected forward view image 181 are firstly extracted from the straight lines detected in S3. When four lane lines 182 may be detected as straight lines as shown in FIG. 4, two lane lines 182 that define the lane in which the vehicle 1 travels are used, for example. A point where these two lane lines 182 intersect is referred to as the vanishing point 183. FIGS. 11A and 11B illustrate the relationship between the lane lines 182 and the vanishing point 183.

In S5, the orientation of the camera 110 is detected. S5 corresponds to a camera orientation detection section. The orientation of the camera 110 means the orientation of the optical axis of the camera 110. Since the camera 110 is included in the drive recorder, the camera 110 is often installed after the purchase of the vehicle, and the orientation of the camera 110 may often be changed even after the installment. The orientation of the camera 110 differs for each vehicle 1. Therefore, the orientation of the camera 110 is detected in S5.

Specifically, the orientation of the camera 110 is indicated by the yaw angle rx and the tilt angle ry. The yaw angle rx and the tilt angle ry may be expressed by Equations 4 and 5, respectively. In Equation 4, $\Delta x$ is the distance in the x direction between an image center 184 and the vanishing point 183 in the corrected forward view image 181, as shown in FIGS. 11A and 11B. In Equation 5, $\Delta y$ is the distance in the y direction between the image center 184 and the vanishing point 183 in the corrected forward view image 181, as shown in FIGS. 11A and 11B.

[Equation 4]
$$rx = -\tan^{-1}\left(\frac{\Delta x}{f}\right) \quad \text{(Equation 4)}$$

[Equation 5]
$$ry = -\tan^{-1}\left(\frac{\Delta y}{f}\right) \quad \text{(Equation 5)}$$

When the orientation of the camera 110 can be detected in S5, a top view transformation process (that is, bird's-eye-view transformation) is then performed on the corrected forward view image 181 to generate a bird's-eye view image having a viewpoint above the vehicle 1 in S6. S6 corresponds to a bird's-eye-view transformation section.

The top view transformation process is for transforming the optical axis of the camera 110 into downward from upward. An example of top view transformation process may be described in JP 2009-212734 A, for example.

When the corrected forward view image 181 is transformed into a bird's-eye view image, a region, in the corrected forward view image 181, which is also visible when viewed from above the vehicle 1 is transformed into a bird's-eye view image. That is, the road surface and the surroundings thereof in the corrected forward view image 181 are transformed into a bird's-eye view image. The range to be transformed into the bird's-eye view image is determined on the basis of the vanishing point 183 and the angle of view of the camera 110.

In S7, an obstacle is removed from the bird's-eye view image generated in S6. S7 corresponds to an obstacle removal processing section. Due to the transformation into the bird's-eye view image, obstacles outside the range to be transformed into the bird's-eye view image are removed from among the obstacles included in the corrected forward view image 181. It may be possible to remove most of obstacles which may decrease detection accuracy of points of change. The bird's-eye view image may include objects other than road-mounted objects such as a preceding vehicle or a falling object. Therefore, a process for removing obstacles from the bird's-eye view image is performed.

With the method for removing obstacles, a designated color is extracted, and other colors are converted into black. The color to be designated is white or orange which is a color corresponding to road markings or traffic lane lines which are not desired to be removed.

Figure 12:
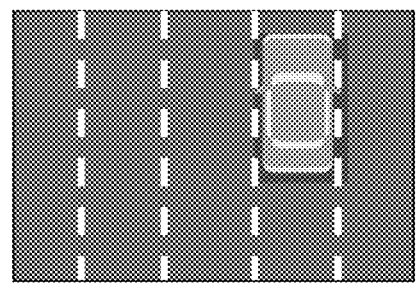
FIG. 12 is a view showing an overhead image before an obstacle is removed.
Figure 13:
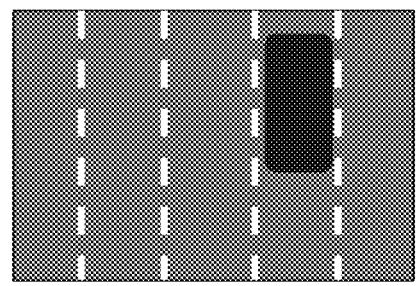
FIG. 13 is a view showing an overhead image after an obstacle is removed.

FIG. 12 shows a bird's-eye view image including a preceding vehicle which is an obstacle. FIG. 13 shows an image from which the obstacle is removed by executing S7. The preceding vehicle is removed from the image shown in FIG. 13 by converting the portion of the preceding vehicle into black. An obstacle smaller than a certain size may be restored to its original color by assuming that such obstacle does not affect the subsequent process.

In S8, the luminance of the bird's-eye view image is entirely adjusted so that the portion with the highest luminance in the bird's-eye view image has the luminance of white. The reason for adjusting the luminance is as follows. The luminance of the bird's-eye view image is affected by an ambient environmental condition when the image is captured by the camera, such as weather, time of day, or a tunnel, and therefore, if the luminance is not adjusted, it is highly likely that a point of change is incorrectly detected. The bird's-eye view image obtained by performing the luminance adjustment in S8 is a bird's-eye view image to be used for collation process.

In S9, the current position supplied from the vehicle position detection section 161 and the bird's-eye view image to be used for collation process obtained by the process in S8 are output to the collation region identification section 163.

(Process of Collation Region Identification Section)

The collation region identification section 163 identifies a collation region from the bird's-eye view image to be used for collation process generated by the image processing section 162. The collation region identification section 163 detects traffic lane lines from the bird's-eye view image to be used for collation process, and determines the range of the collation region in the vehicle width direction on the basis of the number of the traffic lane lines.

Figure 14:
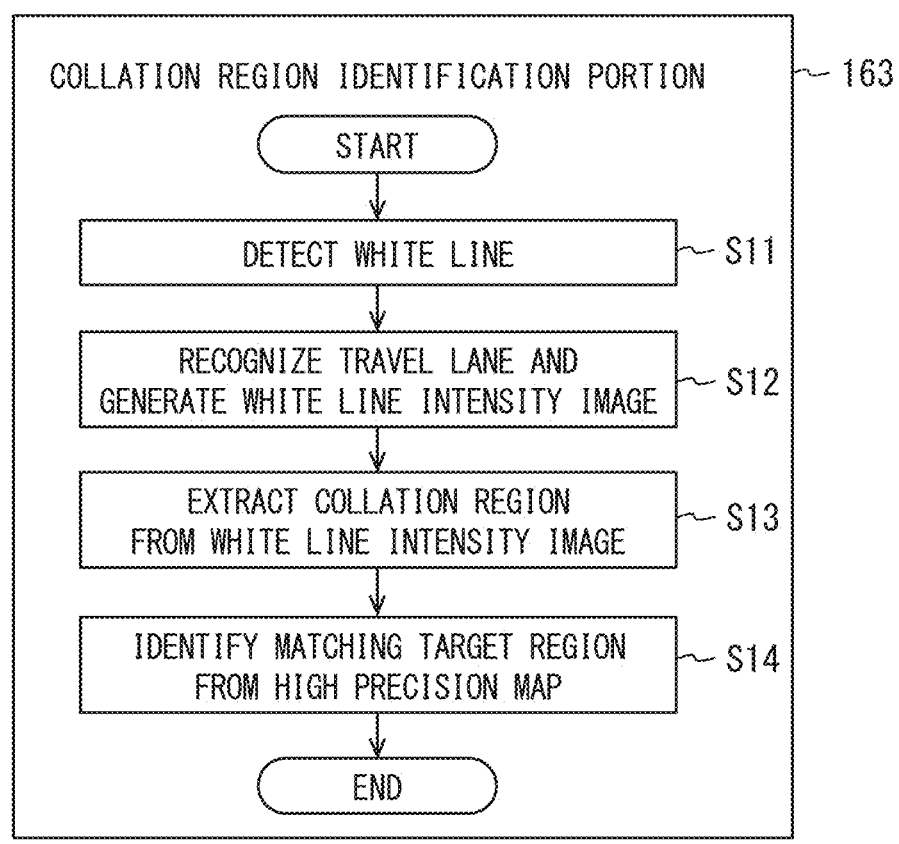
FIG. 14 is a flowchart showing a process executed by a collation region identification section.

The process executed by the collation region identification section 163 is shown in FIG. 14. The detailed process of the collation region identification section 163 will be described with reference to FIG. 14. When the bird's-eye view image to be used for collation process is generated, the collation region identification section 163 executes the process shown in FIG. 14.

In FIG. 14, a white line detection process is executed in S11. In the white line detection process, the following filter process is performed on each pixel of the bird's-eye view image to digitize white-line likelihood. This value is defined as white line intensity G.

The white line intensity G is a value obtained by dividing the sum of pixel values within the range of the assumed white line width S around the pixel of interest (m, n) by the area thereof. The pixel of interest (m, n) is a pixel for calculating the white line intensity G. The white line intensity G is sequentially calculated for all pixels.

The white line intensity G is expressed by Equation 6, Equation 7, and Equation 8. Equation 6 indicates the left white line intensity $G_L$. The numerator of the first term on the right side of Equation 6 indicates the sum of pixel values within the range of the assumed white line width S. The numerator of the second term on the right side of Equation 6 indicates the sum of pixel values outside the assumed white line width S on the left.

Figure 15:
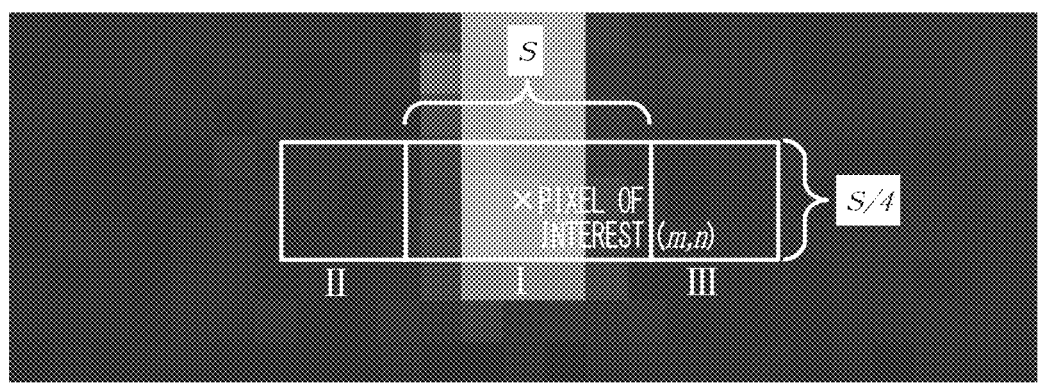
FIG. 15 is a view describing a method for calculating white line intensity.

Equation 7 indicates the right white line intensity $G_R$. The numerator of the first term on the right side of Equation 7 is the sum of pixel values within the range of the assumed white line width S, as in the first term on the right side of Equation 6. The numerator of the second term on the right side of Equation 7 is the sum of pixel values outside the assumed white line width S on the right. FIG. 15 shows the ranges of the sum of pixel values calculated by the numerators of the first and second terms on the right side of Equation 6 and Equation 7, respectively.

As the white line in the image is clearer, the value of the first term on the right side increases and the value of the second term on the right side decreases, in Equations 6 and 7. Therefore, Equations 6 and 7 indicate the white line intensity G.

Equation 8 calculates the square-root of sum of squares in order to combine the left white line intensity $G_L$ and the right white line intensity $G_R$ into one value. In image processing, a method using square-root of sum of squares is common as a method for calculating edge intensity.

[Equation 6]

$$G_L = \frac{\sum_{y=m-\frac{S}{8}}^{m+\frac{S}{8}} \sum_{x=n-\frac{S}{2}}^{n+\frac{S}{2}} P(x,y)}{S \times \frac{S}{4}} - \frac{\sum_{y=m-\frac{S}{8}}^{m+\frac{S}{8}} \sum_{x=n-S}^{n-\frac{S}{2}} P(x,y)}{\frac{S}{2} \times \frac{S}{4}}$$ (Equation 6)

[Equation 7]

$$G_R = \frac{\sum_{y=m-\frac{S}{8}}^{m+\frac{S}{8}} \sum_{x=n-\frac{S}{2}}^{n+\frac{S}{2}} P(x,y)}{S \times \frac{S}{4}} - \frac{\sum_{y=m-\frac{S}{8}}^{m+\frac{S}{8}} \sum_{x=n+\frac{S}{2}}^{n+S} P(x,y)}{\frac{S}{2} \times \frac{S}{4}}$$ (Equation 7)

-continued

[Equation 8]

$$G = \sqrt{G_L^2 + G_R^2}$$ (Equation 8)

FIG. 15 shows the white line intensity G in the horizontal direction of a screen. In S11, white line intensity G in the vertical direction of the screen is also calculated in addition to the white line intensity G in the horizontal direction of the screen.

After the white line intensity G is calculated, white line centers are then detected. In order to detect white line centers, a portion with higher intensity is searched, one line by one line in the vertical direction, for the white line intensity G in the horizontal direction. In this way, white line centers are determined. FIG. 16 shows the magnitude of the white line intensity G of each line in the horizontal direction. The peaks shown in FIG. 16 are determined as white line centers.

In S12, a travel lane is recognized. In the process for recognizing a travel lane, regions where the white line centers detected in S11 are continuous in the vertical, horizontal, and diagonal directions are grouped (or merged) to form one line segment. An image obtained by performing the grouping is defined as a white line intensity image. Further, the accumulated value of the white line intensities G included in the merged line segment is defined as the white line intensity G of the merged line segment, and the line segment having the strongest merged white line intensity G is defined as a reference line.

Line segments are searched near positions distant from the reference line to the left and to the right by an assumed lane width. At most two line segments are searched each on the left and on the right on the basis of the position of the host vehicle. Further, a solid line and a dashed line are distinguished on the basis of the length of each line segment.

From the detected line segment pattern, the travel lane is recognized in accordance with the relationship shown in FIG. 17. The information to be recognized includes information about how many lanes there are in the road where the vehicle 1 is traveling, and information about in which travel lane the vehicle 1 is traveling.

In S13, a collation region is extracted from the white line intensity image generated in S12. The region to be extracted is set such that the region in the longitudinal direction, that is, the region in the front-rear direction of the vehicle 1, is fixed, and the region in the horizontal direction is variable. The range of the collation region in the vertical direction is a fixed range from the end of the white line intensity image on the host vehicle side.

The lateral range of the collation region corresponds to the travel lane recognized in S12. For example, when the number of travel lanes recognized in S12 is three, the entire white line intensity image is determined as the width of the collation region. When the number of travel lanes recognized in S12 is two, the center between the line segments at both ends is defined as the center of the region to be extracted, and the range having the assumed lane width for two lanes plus something extra is determined as the lateral width of the region to be extracted. The image extracted in S13 is rectangular. It may be possible to set a bird's-eye view image of an appropriate size according to the number of traffic lane lines that can be detected from the bird's-eye view image as a collation region. Incidentally, a region removed by the obstacle removal in S7, such as a region including a preceding vehicle or a vehicle traveling alongside, may not be used as the collation region.

In S14, a matching target region is identified from the road surface map of the high precision map 151. The matching target region is a given region determined based on the current position. The vertical and horizontal sizes of the matching target region are set to be larger than those of the collation region in the white line intensity image so that it may be possible to perform the collation determination while the collation region in the white line intensity image is shifted with respect to the matching target region.

(Process of Collation Processing Section)

The collation processing section 164 detects a point of change by collating the white line intensity image including the collation region extracted in S13 with the road surface map of the high precision map 151 including the matching target region identified in S14. The detailed process of the collation processing section 164 will be described with reference to FIG. 18. The collation processing section 164 executes the process shown in FIG. 18 when the collation region and the matching target region are determined.

Figure 18:
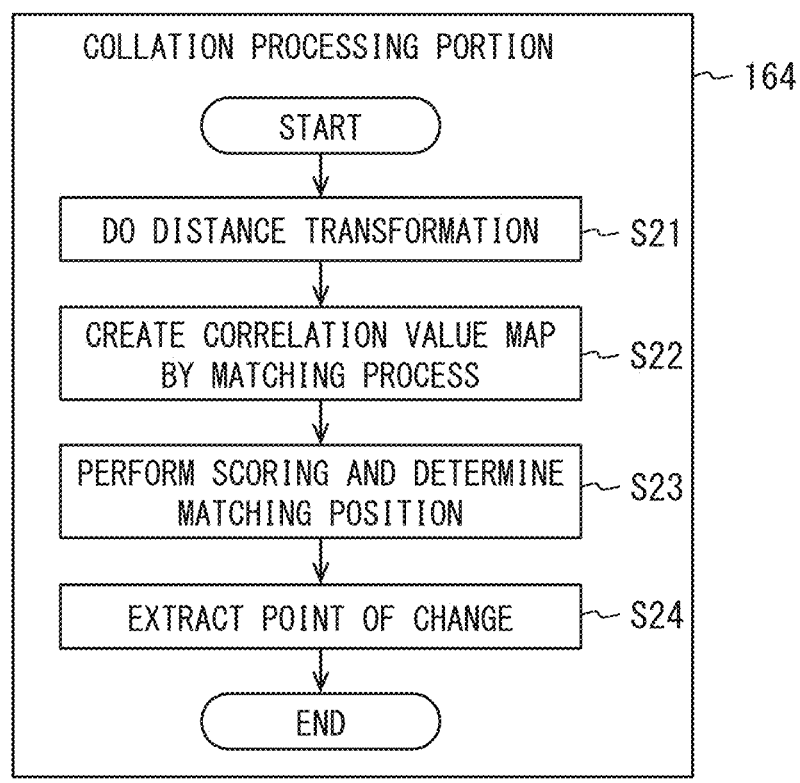
FIG. 18 is a flowchart showing a process executed by a collation processing section.

In S21 in FIG. 18, distance transformation is performed on the high precision map 151 including the matching target region identified in S14. The distance transformation here is the same as the distance transformation widely used in image processing. Specifically, the distance from a zero pixel to the nearest non-zero pixel is calculated for all zero pixels, and the pixel value of the zero pixel is replaced by its distance.

If the high precision map 151 and the white line intensity image are directly matched, the correlation value will be lowered even with a little difference in a lane width. Therefore, distance transformation is performed on the high precision map 151 including the matching target region.

Equation 9 indicates the distance transformation equation. In Equation 9, the left side indicates a distance to be replaced, x is a horizontal distance to a non-zero pixel, y is a vertical distance to the non-zero pixel, and N is a preset coefficient.

[Equation 9]

$$\text{Dist} = N\sqrt{x^2+y^2} \qquad \text{(Equation 9)}$$

Figure 19:
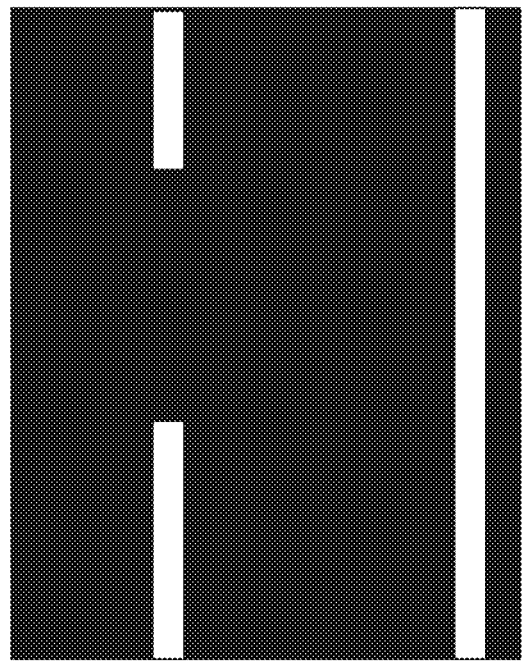
FIG. 19 is a view showing a high precision map before distance transformation.
Figure 20:
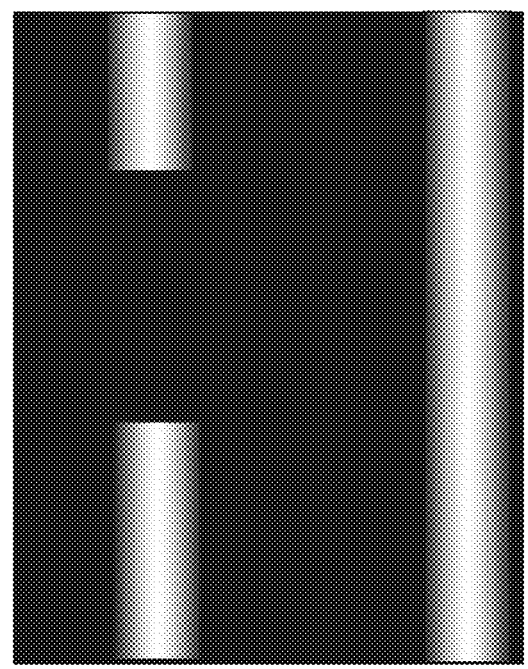
FIG. 20 is a view showing a high precision map after distance transformation.

FIGS. 19 and 20 show maps before and after distance transformation. FIG. 19 shows the map before distance transformation, that is, the high precision map 151. When distance transformation is performed, white lines become blurred as shown in FIG. 20.

In S22, a correlation value between the matching target region in the high precision map 151 which has been subjected to the distance transformation in S21 and the collation region in the white line intensity image is calculated, while the position of the collation region in the white line intensity image is changed by a predetermined value. A correlation value map can be created by calculating the correlation value while changing the position of the collation region in the white line intensity image by a predetermined value. The correlation value map represents the relationship between the relative position of the collation region to the matching target region and the correlation value.

During the calculation of the correlation value, when the distance between the traffic lane lines included in the white line intensity image and the distance between the traffic lane lines included in the high precision map 151 after the distance transformation do not match, the white line intensity image is scaled, or the white line intensity image is subjected to projective transform. FIG. 21 shows a diagram for scaling the white line intensity image, and FIG. 22 shows a diagram for performing projective transform on the white line intensity image. The whole size of the white line intensity image is adjusted such that the lane lines in the high precision map 151 and the lane lines in the white line intensity image coincide with each other by the scaling, projective transform, or the like. S22 corresponds to a correlation value map creation section.

In S23, scoring is performed. Scoring indicates quantifying the likelihood of the position of the collation region in the white line intensity image. Specifically, a scoring map is first created in S23. In the scoring map, the coefficient of the current position of the vehicle 1 detected by the vehicle position detection section 161 is set as 1 assuming that such a current position has the highest likelihood, and a position farther from the current position has a lower coefficient.

Figure 23:
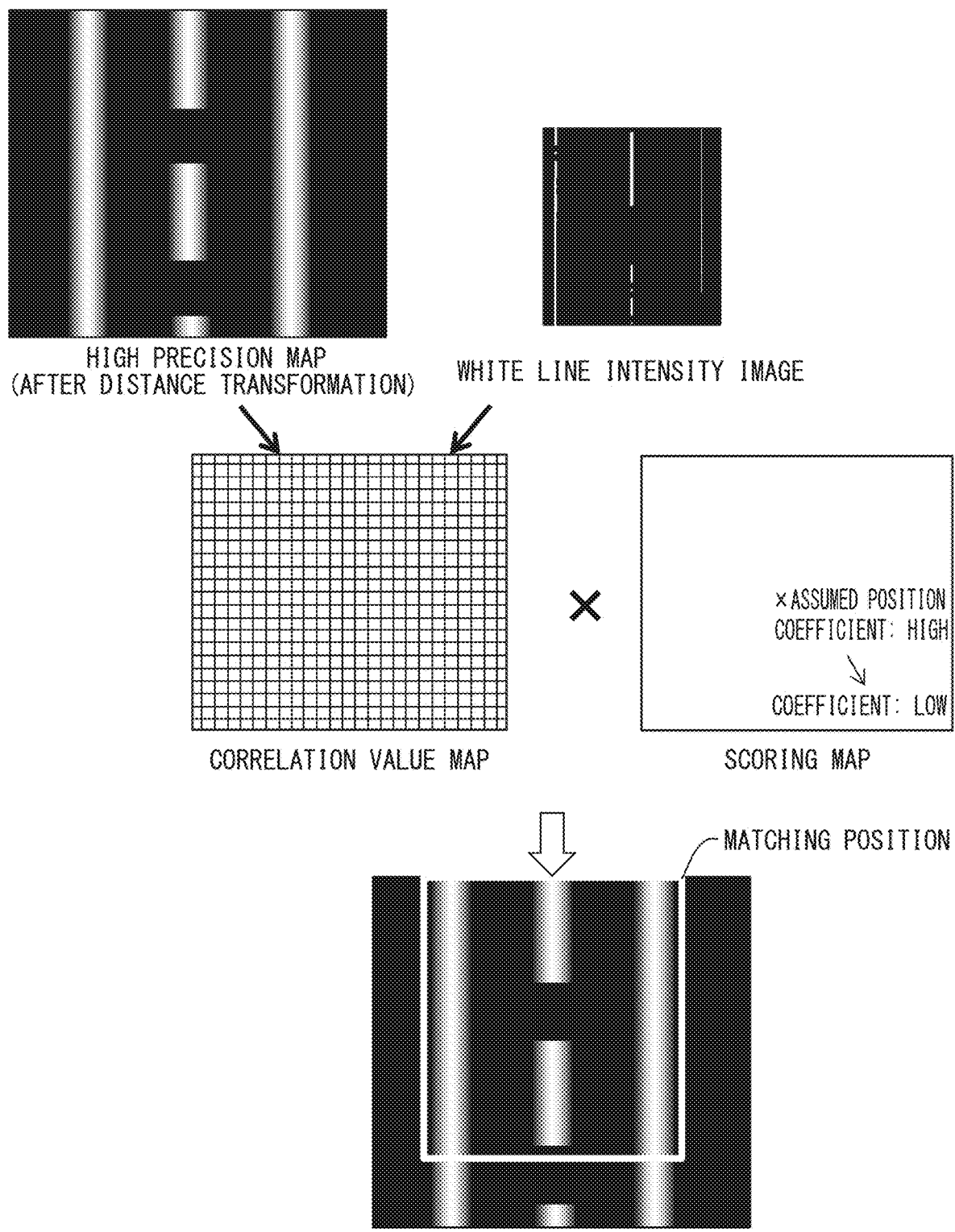
FIG. 23 is a view describing scoring executed in S23 in FIG. 15.

As shown in FIG. 23, scoring is performed by multiplying the scoring map with the correlation value map created in S22. The position with the highest score is determined as a matching position. S23 corresponds to a matching position determination section.

In S24, the white line intensity image is converted into grayscale, and an absolute value of the difference between the high precision map 151 corresponding to the position of the white line intensity image determined in S23 and the white line intensity image is obtained. If this absolute value is equal to or greater than a predetermined value, the position is determined to be a point of change.

Further, the absolute value of the difference between the high precision map 151 and the white line intensity image is replaced with the HSV color space and the resultant is output. Specifically, when the absolute value is replaced with the HSV space, S (saturation) and V (brightness) are fixed, and the value of H (hue) is converted. Further, the absolute value of the difference is normalized to 0 to 255. The normalized value is defined as the value of H. Then, red and blue in H are replaced so that blue has 0 and red has 255. As a result, a point of change such as an increase or decrease in painting is represented as differences in color as road information.

The point of change detected in this manner is accumulated in the accumulated data storage portion 170. Further, the position of the point of change is provided to an update information utilization system 2 which is an external system. The update information utilization system 2 plots points of change on a map, generates a list, and manages points of change, that is, road update information indicating that the road has been updated. Further, comparison between road update information items by period may be enabled so that it may be possible to confirm in which period the new road has been opened.

As described above, the road map information update system 100 transforms the forward view image 180 captured by the camera 110 into a bird's-eye view image. Due to the transformation into the bird's-eye view image, the road width in the image becomes constant like the actual road, despite the distance from the vehicle 1. Further, due to the transformation into a bird's-eye view image, it may be possible to remove various objects present in a place other than the road surface, such as buildings and trees.

The white line intensity image generated from the bird's-eye view image is used as an image to be collated with the road surface map which is a part of the high precision map 151. Thus, even if the resolution of the camera 110 is low, it may be possible to detect a point of change accurately.

Further, in the present embodiment, obstacles are removed from the bird's-eye view image by executing the process in S7. It may be possible to detect the point of change more accurately.

Further, in the present embodiment, the position of the white line intensity image having the highest correlation value as a result of the matching process is not directly set as a matching position, but the correlation value is corrected using the scoring map that is determined based on the current position measured by the vehicle position detection section 161. The detection accuracy of a point of change is further improved.

Second Embodiment

A second embodiment will be described. In the following description of the second and subsequent embodiments, elements having the same reference numerals as those that have been used are, unless otherwise specified, the same as the elements with the same numerals in the previous embodiment. When only some parts of the configuration are described, the previously described embodiment can be applied to other parts of the configuration.

Figure 24:
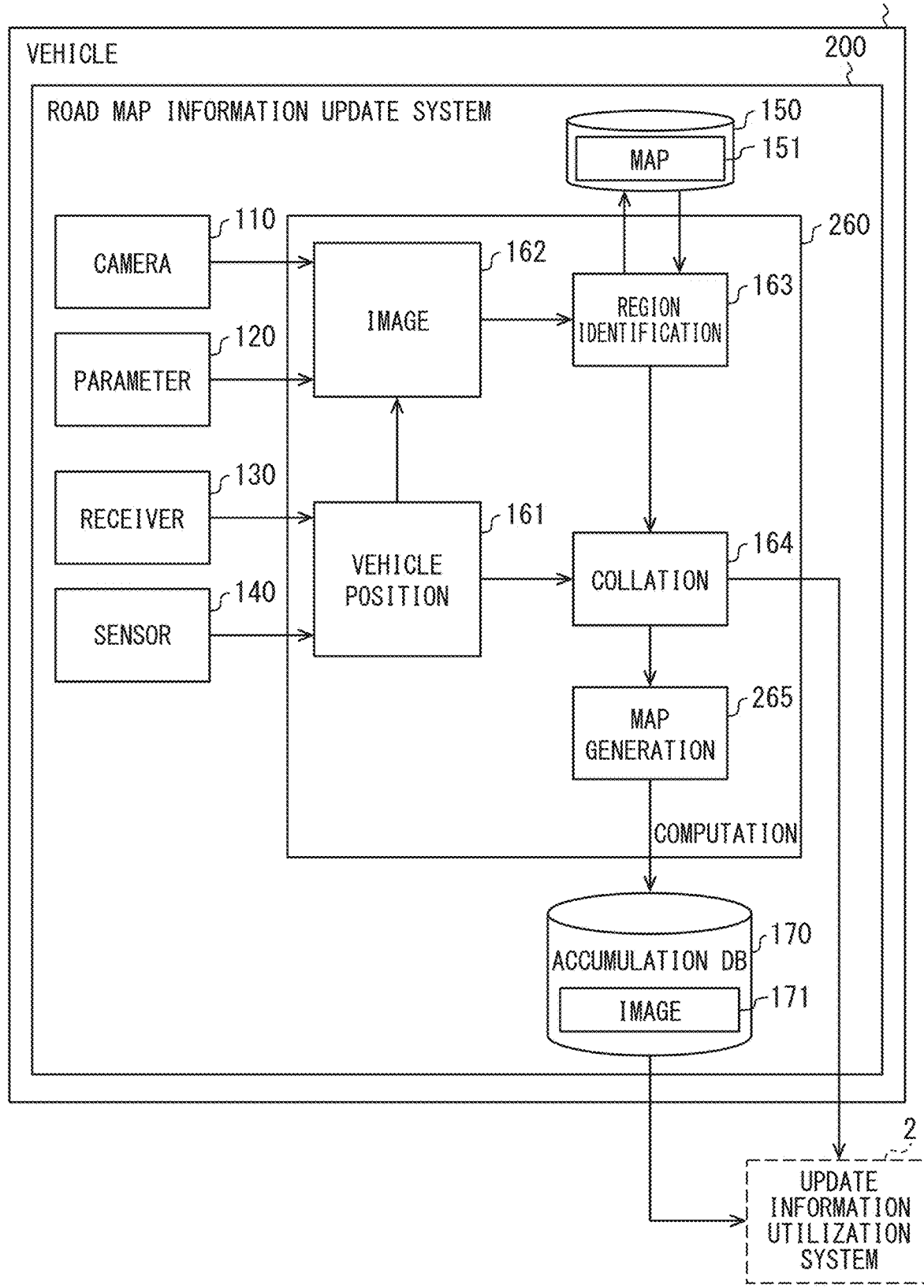
FIG. 24 is a block diagram showing a configuration of a road map information update system according to a second embodiment.

FIG. 24 shows the configuration of a road map information update system 200 according to the second embodiment. The road map information update system 200 according to the second embodiment differs from the road map information update system 100 according to the first embodiment in that a computation portion 260 includes a map generation section 265. Further, a generated map image 171 is stored in the accumulated data storage portion 170. The generated map image 171 is a map obtained by combining a bird's-eye view image.

When the collation processing section 164 detects a point of change, the map generation section 265 generates a map on which information on the point of change is reflected. The detailed process of the map generation section 265 will be described with reference to FIG. 25.

Figure 25:
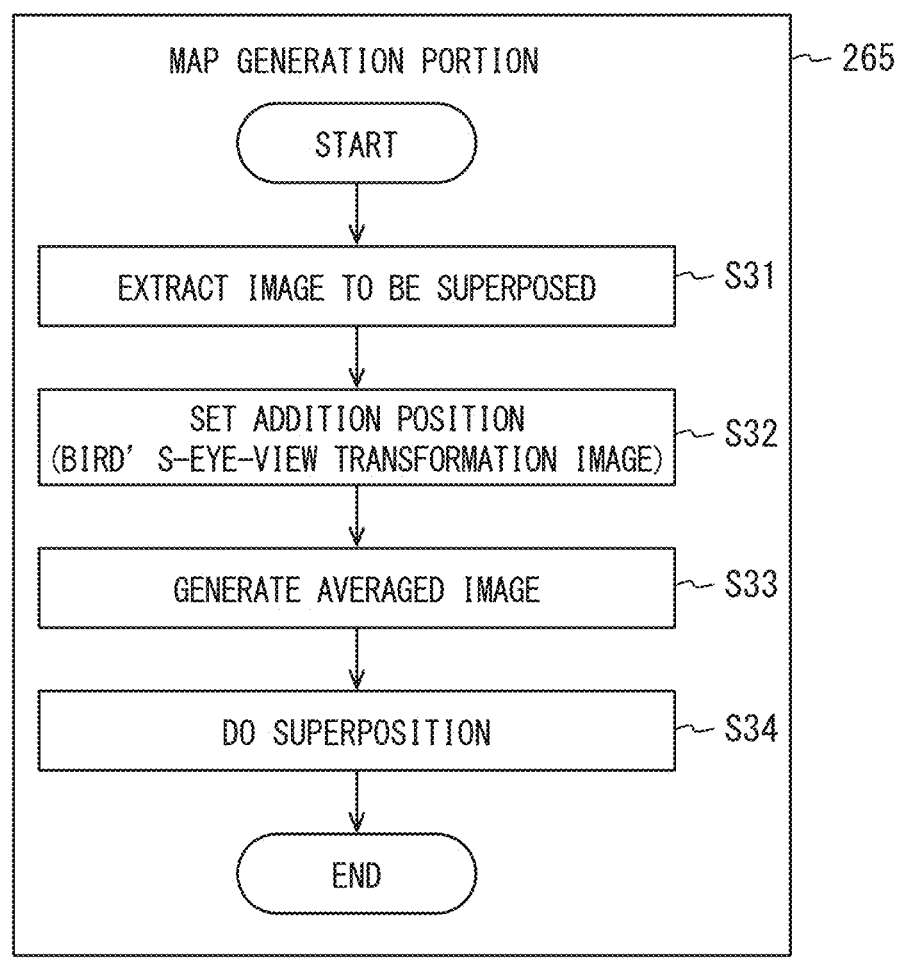
FIG. 25 is a flowchart showing a process executed by a map generation section in FIG. 20.
Figure 26:
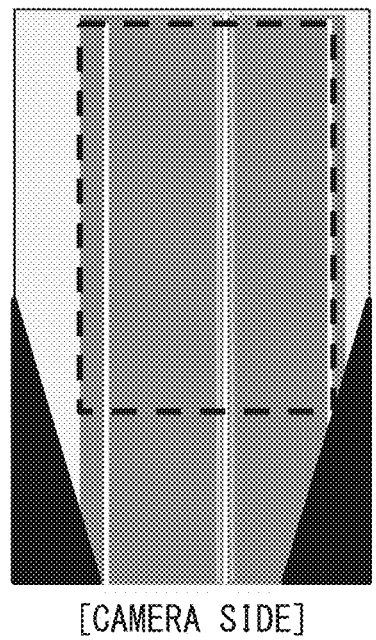
FIG. 26 is a view showing a bird's-eye view image to be used for collation process generated by the image processing section.
Figure 27:
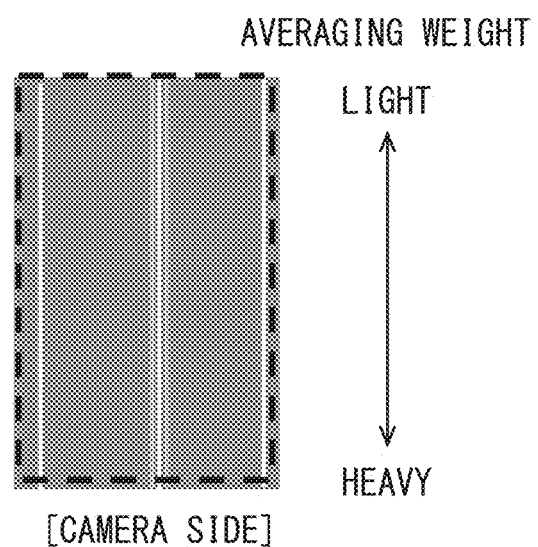
FIG. 27 is a view describing an image extracted from FIG. 25 in S31 in FIG. 25.

In S31 in FIG. 25, a bird's-eye view image to be superposed is extracted. Specifically, a region corresponding to the collation region in the white line intensity image extracted in S13 is extracted from the bird's-eye view image to be used for collation process generated by the image processing section 162. FIG. 26 shows the bird's-eye view image to be used for collation process generated by the image processing section 162. FIG. 27 shows the bird's-eye view image to be superposed extracted in S31. Incidentally, the region including objects other than road surface information in the extracted bird's-eye view image is excluded from the region to be used. The image extracted in S31 is a map image.

In S32, the position where the bird's-eye view image extracted in S31 is to be added to the generated map image 171 is determined. This position is the matching position determined in S23.

In S33, regarding the addition position determined in S32, an averaged image is generated for the portion where an image is already present in the generated map image 171. The averaged image is an image obtained by averaging an existing image and an image to be added this time. Due to averaging, an influence of a temporary change caused by an object other than the road surface, such as the shadow of the vehicle 1, can be reduced.

Further, during averaging, the image is averaged with the existing image with a weight being increased toward the side closer to the camera 110, as shown in FIG. 27. This is because the resolution of the image is higher toward the side closer to the camera 110, due to the characteristics of the bird's-eye view image.

In S34, the images are superposed, and the generated map image 171 is updated. When the images are superposed, the averaged image generated in S33 is superposed on the generated map image 171 in the portion of the generated map image 171 where an image is already present. In the portion of the generated map image 171 where no image is present, the bird's-eye view image extracted in S31 is directly superposed on the generated map image 171.

Since the generated map image 171 which is sequentially updated in this manner includes an image of a point of change, a change in the point of change can be recognized from the image. Therefore, the point of change can be recognized without running the measurement truck, whereby cost for updating the high precision map 151 can be reduced. The updated contents can also be used for vehicle control, such as autonomous driving, as temporary information.

Third Embodiment

Figure 28:
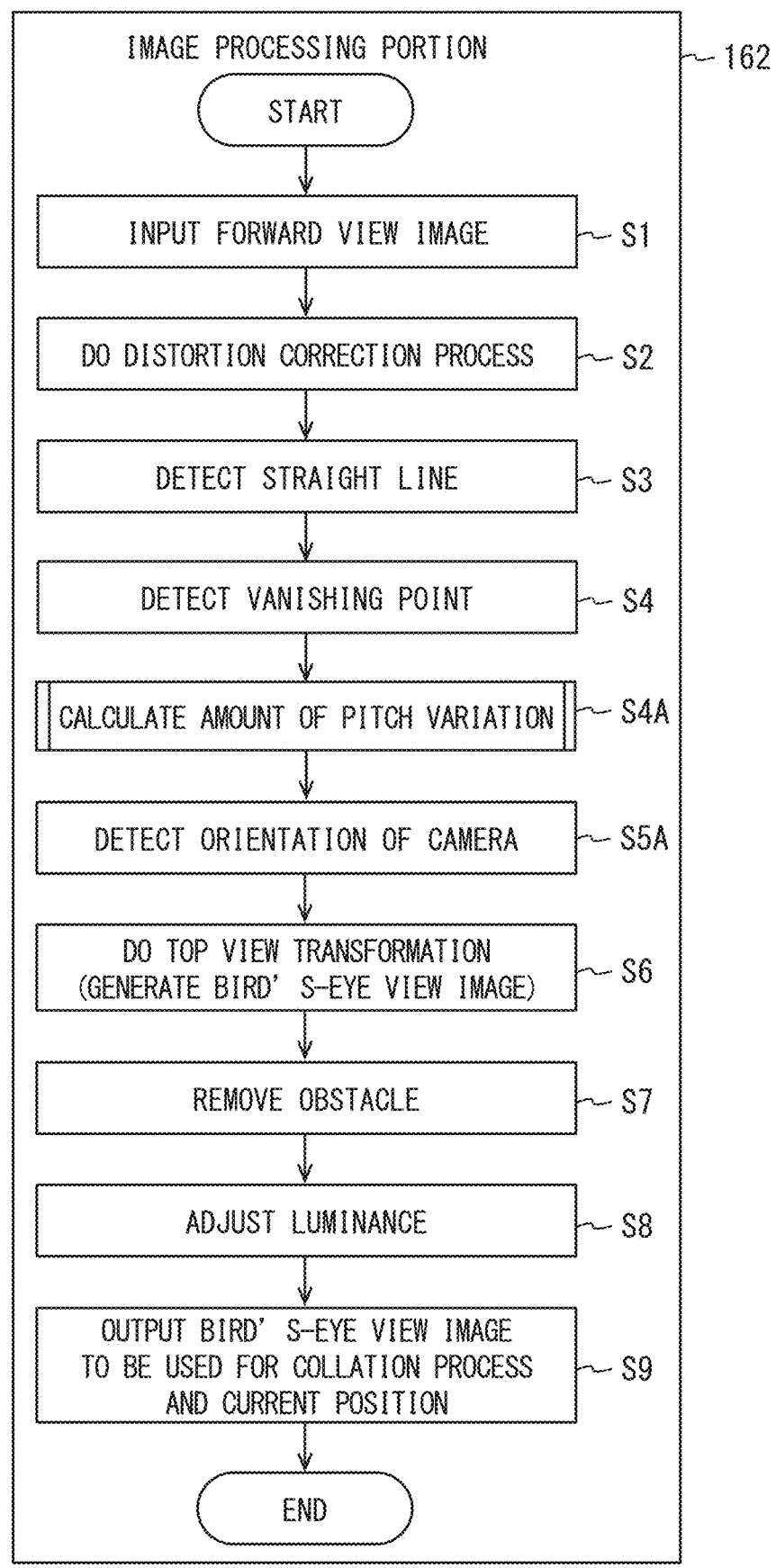
FIG. 28 is a flowchart showing a process executed by an image processing section in a third embodiment.

In the third embodiment, the image processing section 162 executes a process shown in FIG. 28. The process shown in FIG. 28 is obtained by adding S4A to the process shown in FIG. 2 between S4 and S5. Further, S5A is executed instead of S5.

Figure 29:
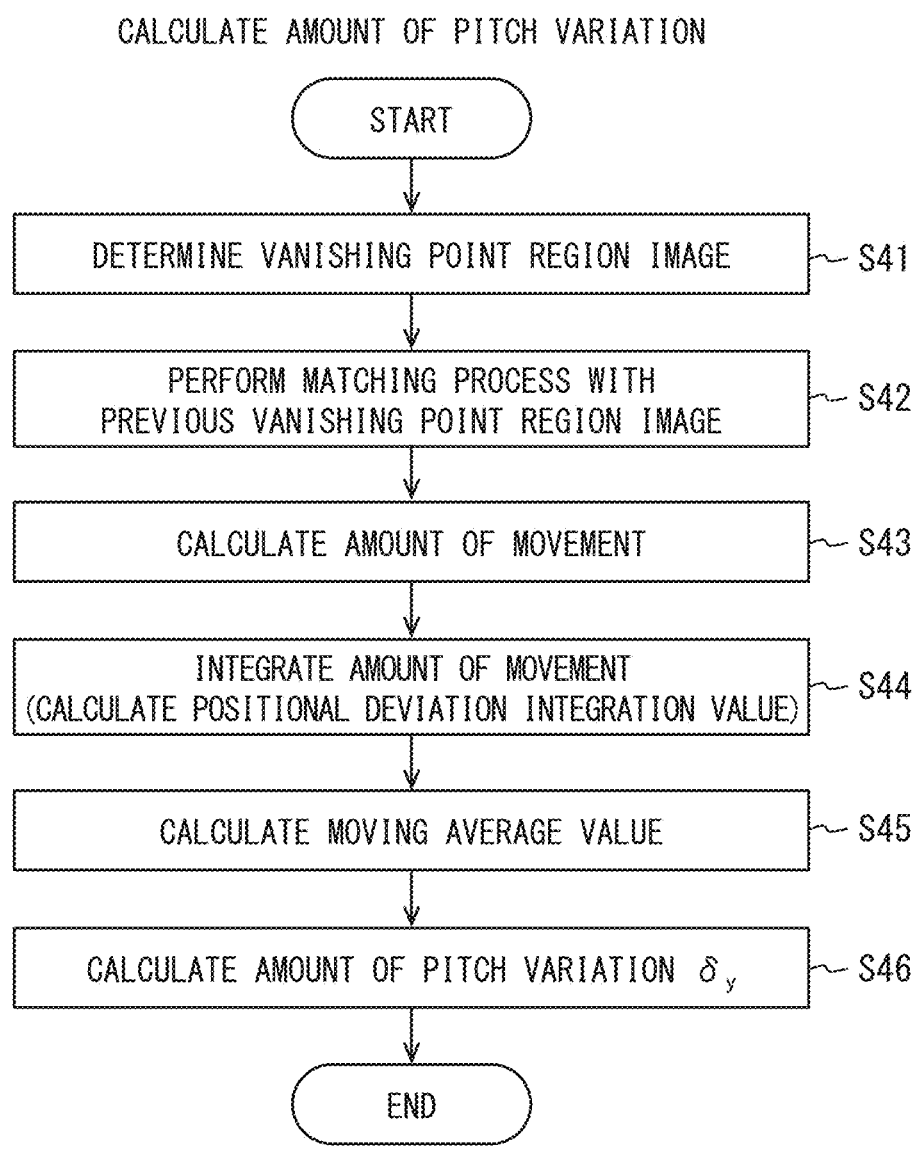
FIG. 29 is a flowchart showing in detail a process in S4A in FIG. 28.
Figure 30:
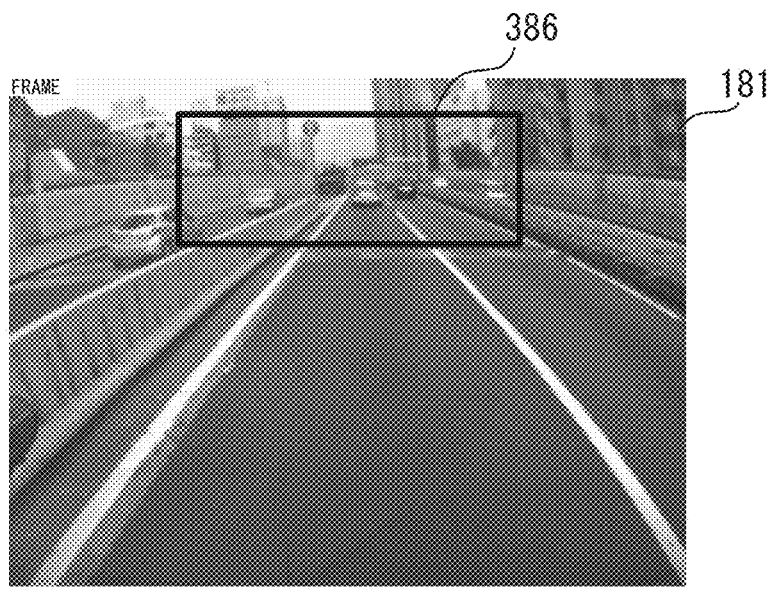
FIG. 30 is a view showing a vanishing point region image in an immediately preceding frame.
Figure 31:
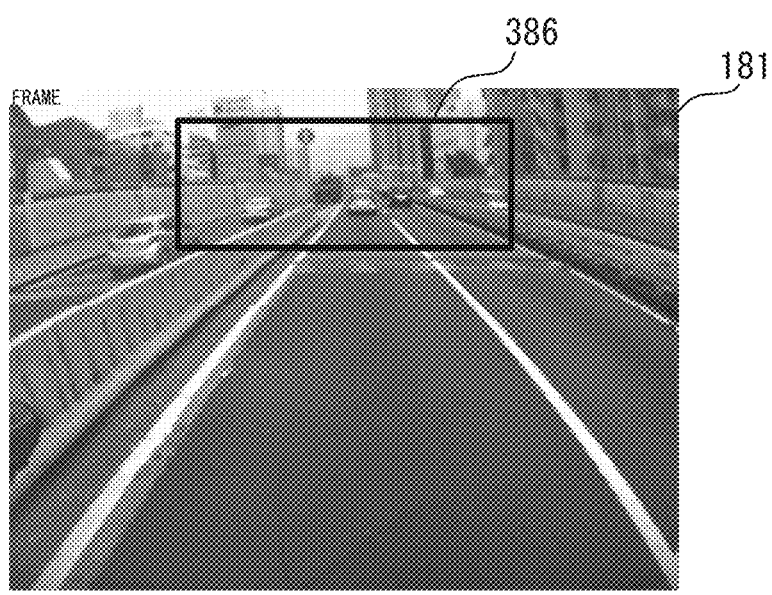
FIG. 31 is a view showing a vanishing point region image obtained in the latest frame.

In S4A, an amount of pitch variation of the corrected forward view image 181 is calculated. The process in 54A is shown in FIG. 29 in detail. In S41 in FIG. 29, a vanishing point region image 386 is determined. As illustrated in FIGS. 30 and 31, the vanishing point region image 386 is an image of a region determined on the basis of the vanishing point in the corrected forward view image 181. The vanishing point region images 386 shown in FIGS. 30 and 31 have a horizontally-long rectangular shape which has a pair of short sides extending in the vertical direction and a pair of long sides extending in the horizontal direction with the vanishing point 183 (see FIGS. 11A and 11B) as a center.

In S42, a matching process is performed for matching the vanishing point region image 386 obtained in the previous frame, that is, the vanishing point region image 386 determined in the previous execution of the process in FIG. 28, and the vanishing point region image 386 obtained in S41 performed immediately before S42. FIG. 30 shows the vanishing point region image 386 obtained in the previous frame, and FIG. 31 shows the vanishing point region image 386 obtained in the current frame. In the matching process, the vanishing point region image 386 obtained in the current frame is moved based on the vanishing point region image 386 obtained in the previous frame so that the two vanishing point region images 386 coincide with each other most perfectly.

In S43, the amount of movement of the vanishing point region image 386 obtained in the current frame in S42 is calculated. The amount of movement is used as a value that indicates a pitch variation occurring in the vehicle 1 within one frame. S41 to S43 correspond to an amount of movement calculation section.

In S44, the amount of movement calculated in S43 is sequentially integrated in the processes, shown in FIGS. 28 and 29, which are repeatedly executed each time the forward view image 180 is input. The integrated value is referred to as a positional deviation integration value. The positional deviation integration value includes the positional deviation of the vanishing point region image 386 due to the pitch variation and a change in the position of the vanishing point region image 386 due to static reasons other than the pitch variation. The static reasons other than the pitch variation include, for example, a change in the optical axis of the camera due to the vehicle 1 traveling on an uphill. S44 corresponds to an integration value calculation section.

In S45, the moving average value of the positional deviation integration value calculated in S44 is calculated. A section to which the moving average is performed is preset. The moving average value is used to indicate the position of the vanishing point region image 386 in a stationary state of the vehicle. The positional deviation integration value also includes a change in value due to static reasons other than the pitch variation. The moving average value is used to calculate a value resulting from the static reasons, and the moving average section is set to a section in which the value resulting from the static reasons can be calculated.

Figure 32:
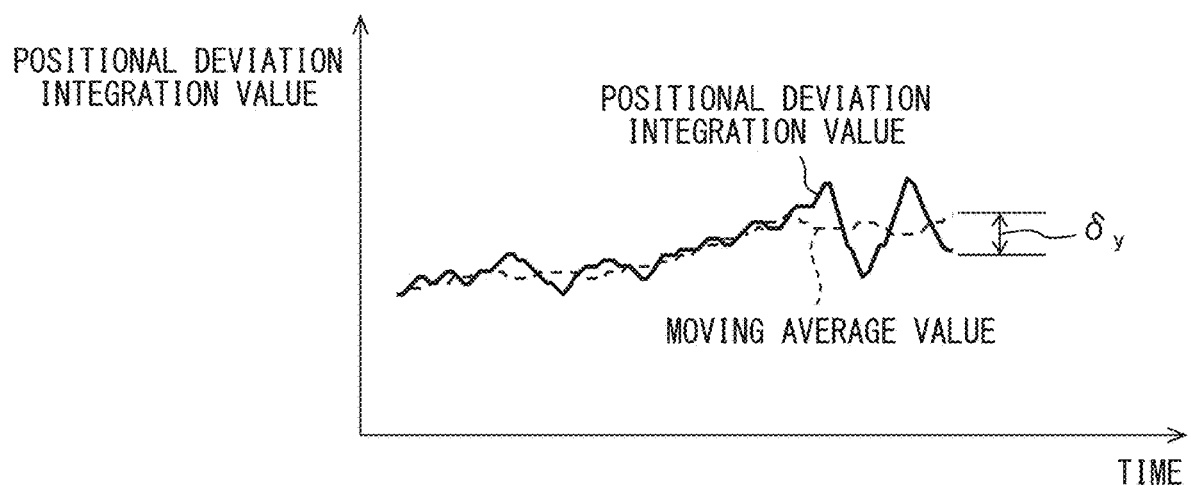
FIG. 32 is a diagram describing an amount of pitch variation.

In S46, the difference between the positional deviation integration value calculated in S44 and the moving average value calculated in S45 is calculated. This difference is referred to as an amount of pitch variation δy. If determined in advance, the amount of pitch variation δy may be calculated from either the equation of (positional deviation integration value)−(moving average value) or the equation of (moving average value)−(positional deviation integration value). S45 and S46 correspond to an amount of pitch variation calculation section. FIG. 32 shows the positional deviation integration value, the moving average value, and the amount of pitch variation δy.

After the process in S46 is executed, the process flow proceeds to S5A in FIG. 28. In S5A, the orientation of the camera 110 is detected. Specifically, the orientation of the camera 110 is indicated by the yaw angle rx and the tilt angle ry, as described in the first embodiment. The yaw angle rx is obtained from Equation 4 described in the first embodiment. The tilt angle ry is obtained from Equation 10. As shown in Equation 10, the yaw angle rx is calculated from the distance Δy between the image center 184 and the vanishing point 183 in the y direction and the amount of pitch variation δy.

[Equation 10]

$$ry = -\tan^{-1}\left(\frac{\Delta y + \delta y}{f}\right) \quad \text{(Equation 10)}$$

The processes after the execution of S5A are the same as those of the first embodiment. S6 to S9 are executed to output the bird's-eye view image to be used for collation process and the current position to the collation region identification section 163.

(Pitch Correction)

Figure 33:
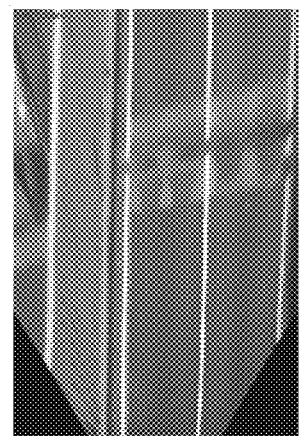
FIG. 33 is a view showing a bird's-eye view image not subjected to pitch correction.
Figure 34:
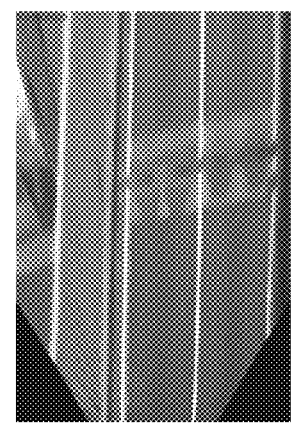
FIG. 34 is a view showing a bird's-eye view image which has been subjected to pitch correction.

FIG. 33 shows a bird's-eye view image not subjected to pitch correction. FIG. 34 shows a bird's-eye view image subjected to pitch correction. The bird's-eye view image subjected to pitch correction is the bird's-eye view image obtained by performing the process in FIG. 28. In the bird's-eye view image not subjected to pitch correction, the distance between the white lines increases toward the top side from the bottom side. On the other hand, in the bird's-eye view image subjected to the pitch correction, the white lines are substantially parallel to each other.

Due to the pitch correction as described above, the white lines in the bird's-eye view image can be made substantially parallel to each other. Therefore, the accuracy of the subsequent process performed based on this bird's-eye view image is improved.

Fourth Embodiment

A fourth embodiment will be described. In the first embodiment, the collation processing section 164 determines the matching position separately for each frame. On the other hand, in the fourth embodiment, the matching position is finally determined for each frame, but as preprocessing, the matching position is determined for an image obtained by combining a plurality of frames. Thereafter, the image for determining the matching position is sequentially reduced in size.

In the fourth embodiment, the matching position is determined for an image obtained by combining a plurality of frames, as described above. Therefore, the image processing section 162 executes the process when the forward view images 180 of a plurality of frames are input. The details of the process executed by the image processing section 162 in the fourth embodiment are the same as those in the previous embodiments except that the forward view images 180 of a plurality of frames are targets to be processed.

The number of the plurality of frames can be set as appropriate. For example, the plurality of frames may be all frames recorded by the drive recorder in one event.

The collation region identification section 163 identifies a collation region for all of the bird's-eye view images to be used for collation process generated by the image processing section 162. The processes executed by the collation processing section 164 in the fourth embodiment are the same as those in the embodiments previously described except that the bird's-eye view images of a plurality of frames are targets to be processed.

Figure 35:
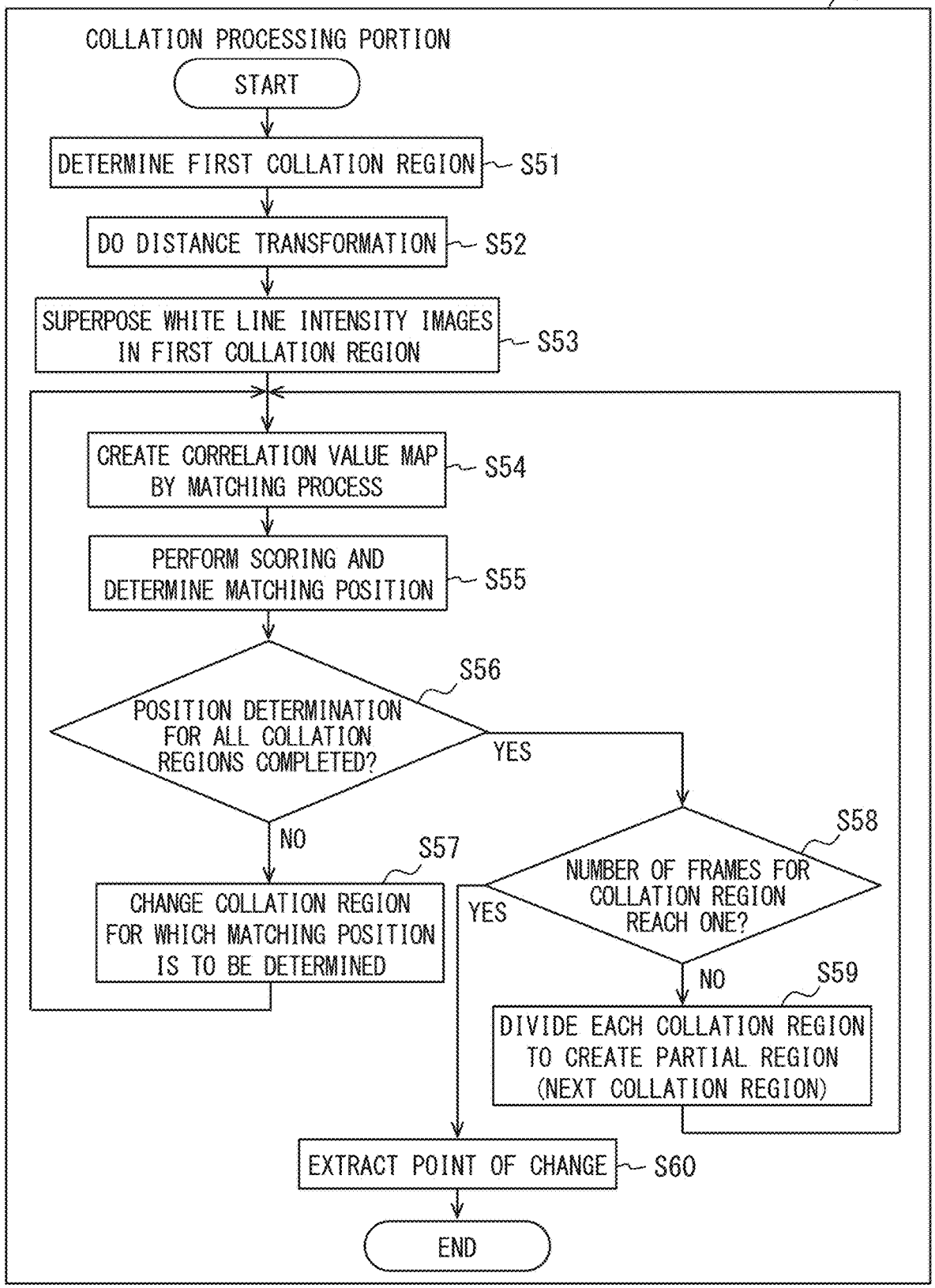
FIG. 35 is a flowchart showing a process executed by a collation processing section in a fourth embodiment.

In the fourth embodiment, the collation processing section 164 executes a process shown in FIG. 35. The collation processing section 164 executes the process shown in FIG. 35 when the collation region identification section 163 identifies a collation region.

Figure 36:
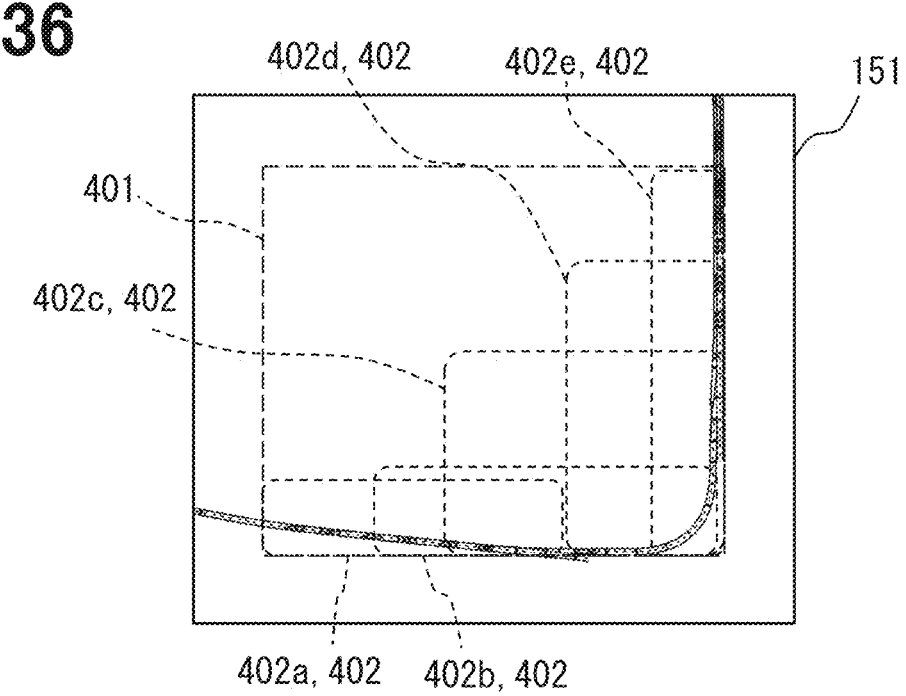
FIG. 36 is a diagram showing a relationship between a first collation region and a first partial region.

In S51, the first collation region 401 as shown in FIG. 36 is determined. The first collation region 401 is a region obtained by combining the collation regions in the white line intensity images of a plurality of frames. The first collation region 401 shown in FIG. 36 is a region obtained by combining the collation regions in the white line intensity images respectively determined from all the frames included in the image data obtained from the drive recorder for one event.

In S52, the process same as the process in S21 in FIG. 18 is performed on the matching target region, which is determined on the basis of the first collation region 401 determined in S51, in the high precision map. The collation region identification section 163 determines the matching target region from the road surface map of the high precision map 151 on the basis of the collation region, as described in S14 in FIG. 14. That is, the collation region identification section 163 determines the matching target region in the road surface map with respect to the collation region for one frame. Therefore, in S52, distance transformation is performed on a region obtained by adding, for all frames included in the first collation region 401 determined in S51, the matching target regions in the road surface map with respect to the collation region for one frame determined by the collation region identification section 163.

In S53, the collation regions in all the white line intensity images included in the first collation region 401 determined in S51 are superposed. The process for superposing the regions is the same as the process of the map generation section 265 described in the second embodiment.

In S54, a matching process is performed on the collation region to create a correlation value map. In the first execution of the process in S54 after the execution of the S51 to S53, the collation region is the first collation region 401 determined in S51. The subsequent collation region is determined by the execution of S59. The process in S54 is the same as the process in S22 in FIG. 18 except that the regions are different. Therefore, S54 corresponds to a correlation value map creation section.

In S55, scoring is performed, and a matching position is determined. The process in S55 is the same as the process in S23 in FIG. 18. Therefore, S55 corresponds to a matching position determination section.

In S56, it is determined whether the determination of matching positions of all the collation regions is completed. Initially, there is only one collation region 401, and when the process in S59 is executed, a plurality of partial regions is determined from one collation region. Each of the partial regions is set as a next collation region. Therefore, there may be a plurality of collation regions. If there is a plurality of collation regions, the matching positions are determined sequentially. Therefore, in S56, it is determined whether the determination of the matching positions for all the collation regions is completed.

If the determination in S56 is NO, the collation region for which the matching position is to be determined is changed to the collation region for which the matching position has not yet been determined in S57. Thereafter, S54 and S55 are executed to determine the matching position.

If the determination in S56 is YES, the process flow proceeds to S58. In S58, it is determined whether the number of frames for the collation region for which the matching position has been determined reaches one. The number one corresponds to the final number of frames. In the present embodiment, the final number of frames is set to be one, but it can be set to be more than one (for example, two). If the determination in S58 is NO, the process flow proceeds to S59.

In S59, each of the collation regions is divided to create partial regions. FIG. 36 shows the first collation region 401 and partial regions 402a, 402b, 402c, 402d, and 402e. FIG. 36 also shows the road surface map of the high precision map 151. When the partial regions 402a, 402b, 402c, 402d, and 402e are not distinguished, they are described as a partial region 402. The partial region 402 is a region which is to be the second collation region.

The partial region 402 is included in the first collation region 401 and is a part of the first collation region 401. In addition, the partial region 402 is a range including a part that may be a lane line in the first collation region 401. The possibility of being a lane line is determined, for example, from a change in edge intensity.

The size of the partial region 402 is equal to or more than a half of the size of the first collation region 401, for example. If the partial region 402 is too small with respect to the first collation region 401, it is difficult to obtain an effect of suppressing a situation in which an incorrect matching position is undesirably determined by performing alignment little by little. The number of partial regions 402 is one or more and can be set arbitrarily. It may be preferable that the number is set to be two or more. In the example in FIG. 36, the number of partial regions 402 is five.

When the number of partial regions 402 is set to be two or more, it is preferable that the respective partial regions 402 partly overlap each other. This is because, if a part of a certain partial region 402 is also a part of another partial region 402, a situation in which an incorrect matching position is determined for the partial region 402 can be prevented.

The created partial regions serve as the next collation regions. After the next collation regions are determined, S54 and subsequent steps are executed. In the second and subsequent executions of S55, the matching target region is the collation region from which the partial regions are generated in previous S59. Due to the execution of S54 to S59, the matching position of the collation region is determined while the collation region is sequentially reduced until the number of frames for the collation region reaches one.

Figure 37:
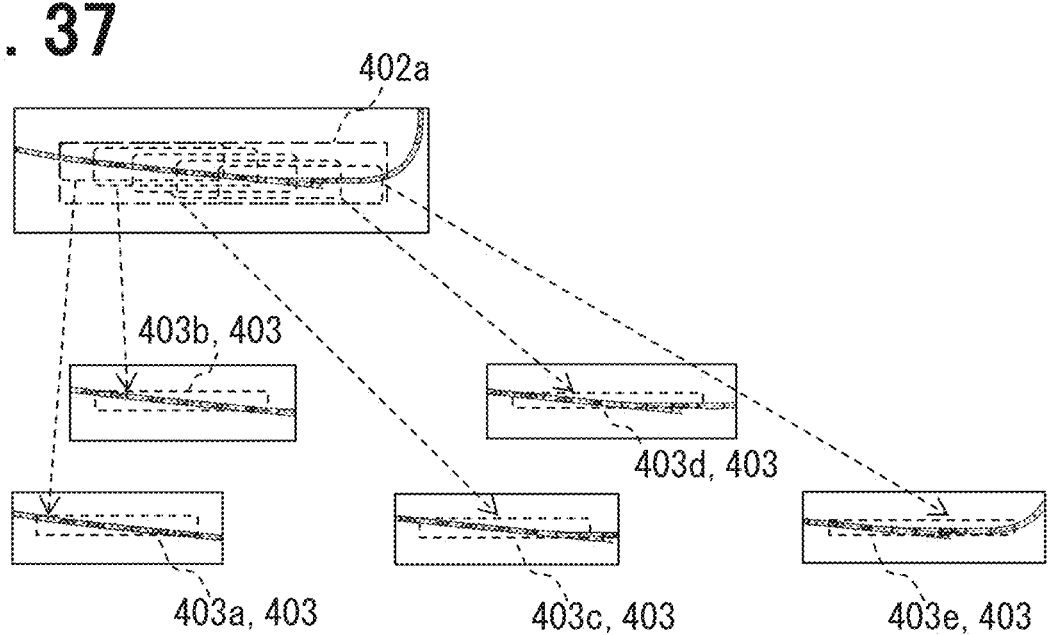
FIG. 37 is a view showing a relationship between the first partial region and a second partial region.

FIG. 37 illustrates second partial regions 403a, 403b, 403c, 403d, and 403e created from the first partial region 402a. When the partial regions 403a, 403b, 403c, 403d, and 403e are not distinguished from one another, they are referred to as a partial region 403. The partial region 403 is a part to be the third collation region.

Each of the partial regions 403a, 403b, 403c, 403d, and 403e is a part of the partial region 402a. Each of the partial regions 403a, 403b, 403c, 403d, and 403e is a range including a portion which may be a lane line. When the part that may be a lane line is near the edge of the collation region from which the partial region 403 is to be determined, the partial region 403 may be determined such that a part of the partial region 403 is outside the collation region. That is, a part of the partial region determined from the collation region may be located outside the collation region. This is because, when the lane line is set to be positioned closer to the center than to the edge, the accuracy of the matching position is improved as compared to the case where the lane line is positioned at the edge of the partial region 403. The matching target region for the partial regions 403a, 403b, 403c, 403d, and 403e is the partial region 402a in the example in FIG. 37.

Similar to the first partial region 402, the number of created second partial regions 403 is five, and they are created so as to partly overlap each other. The third and subsequent partial regions (that is, the fourth and subsequent collation regions) are also created in the same manner as the first and second partial regions 402 and 403.

When a plurality of collation regions is created in S59 and the collation regions partly overlap each other, matching positions are obtained from the plurality of collation regions having the overlapping regions. That is, a plurality of matching positions can be obtained for the overlapping region. The position of the overlapping region is determined in consideration of both a plurality of matching positions, such as by averaging a plurality of matching positions. The positions of regions other than the overlapping region in the collation region are also determined in accordance with the position of the overlapping region. When the position of the overlapping region is determined in consideration of the matching positions of a plurality of collation regions in this manner, a situation in which the matching position of the collation region is incorrectly determined can be prevented, as compared with the case where the collation region is determined such that there is no overlapping region.

When the number of frames for the collation region reaches one, the determination in S58 is YES and the process flow proceeds to S60. In S60, a point of change is extracted. The process in S60 is the same as the process in S24 in FIG. 18.

As described above, the collation processing section 164 in the fourth embodiment determines the matching position using a large collation region, and sequentially determines the matching position while reducing the collation region. As a result, a situation in which a matching position is incorrectly determined can be prevented, even if, in a small region, an image similar to an image of a certain collation region is also present at a position different from the original position in the collation region.

While the embodiments of the present disclosure have been described above, the present disclosure is not limited to the above embodiments, and modifications described below are also included in the scope of the disclosure. In addition, various modifications other than those described below are possible without departing from the spirit of the present disclosure.

(First Modification)

A center outside the vehicle 1 may perform a part of the process performed by the map generation section 265 in the second embodiment. In this case, the image extracted in S31 is transmitted to the center. Then, the processes in S32 and subsequent steps are performed by the center.

(Second Modification)

In the generated map image 171 in the second embodiment, the bird's-eye view image to be used for collation process is used as an image for generating the generated map image 171. A white line intensity image may be used as an image for generating the generated map image 171.

(Third Modification)

The center may have the functions of the image processing section 162, the collation region identification section 163, and the collation processing section 164, and the vehicle 1 may sequentially transmit the forward view image 180 and the current position of the vehicle 1 detected by the vehicle position detection section 161 to the center. In addition, the process of the image processing section 162 may be performed by the vehicle 1 and the processes of the collation region identification section 163 and the collation processing section 164 may be performed by the center. In addition, the processes of the collation region identification section 163 may be performed by the vehicle 1 and the process of the collation processing section 164 may be performed by the center. In such cases, the vehicle 1 includes a communication unit for communicating with the center.

When the process of the collation region identification section 163 is performed by the vehicle 1, the center can also designate an area to be processed to the vehicle 1. Then, the center may transmit only the high precision map 151 for the designated area to the vehicle 1. The vehicle 1 can reduce the capacity and the communication amount for storing the high precision map 151, and the center can also reduce the processing load.

(Fourth Modification)

A camera for capturing an area behind the vehicle may be used as the camera 110.

It is noted that a flowchart or the processing of the flowchart in the present application includes multiple steps (also referred to as sections), each of which is represented, for instance, as S1. Further, each step can be divided into several sub-steps while several steps can be combined into a single step.

In the above, the embodiment, the configuration, an aspect of a map points-of-change detection device according to the present disclosure are exemplified. However, the present disclosure is not limited to every embodiments, every configuration and every aspect related to the present disclosure are exemplified. For example, embodiments, configurations, and aspects obtained from an appropriate combination of technical elements disclosed in different embodiments, configurations, and aspects are also included within the scope of the embodiments, configurations, and aspects of the present disclosure.

What is claimed is:

1. A map points-of-change detection device comprising:
   a camera that is configured to capture an image of an area around a vehicle, the camera being provided in the vehicle;
   a bird's-eye-view transformation section that is configured to transform the image captured by the camera into a bird's-eye view image;
   a map storage portion that is configured to store a road map including a road surface map;
   a collation processing section that is configured to determine whether a point of change in the road surface map exits by collating the bird's-eye view image with the road surface map, the point of change being a position at which a change has occurred on an actual road surface; and
   a collation region identification section that is configured to determine a region for collation in a width direction of the vehicle from the bird's-eye view image based on a total number of traffic lane lines detected from the bird's-eye view image, wherein
   the collation region identification section extracts a collation region for performing collation from the bird's-eye view image to be used for the collation based on a total number of traffic lane lines detected from the bird's-eye view image;
   the collation region identification section identifies as a matching target region, a predetermined region from the road surface map, the predetermined region being determined based on a current position of the vehicle;
   the collation processing section further comprising
      a correlation value map creation section that calculates a correlation value of the collation region in the bird's-eye view image to be used for the collation with respect to the matching target region in the road surface map while changing positions of the collation region, and creates a correlation value map that indicates a relation between the correlation value and a relative position of the collation region with respect to the matching target region, and
      a matching position determination section that calculates, for each position of the collation region with respect to the matching target region, a score obtained by multiplying a scoring map in which a coefficient is highest at a current position due to highest likelihood and the coefficient decreases with distance from the current position by the correlation value map, and determines a position of the collation region having highest score as a matching position; and
   the collation processing section collates the bird's-eye view image for the collation with the road surface map in the road map by setting the position of the collation region as the matching position.

2. The map points-of-change detection device according to claim 1, further comprising:
   an obstacle removal processing section that, with respect to the bird's-eye view image,
      designates color of an object included in the road surface map, and
      converts at least one color other than the designated color into black, causing an obstacle included in the bird's-eye view image to be removed, wherein,
the collation processing section collates the bird's-eye view image from which the obstacle has been removed with the road surface map.

3. The map points-of-change detection device according to claim 1, wherein,
the collation processing section performs distance transformation on the road surface map, and collates the road surface map after performing the distance transformation with the bird's-eye view image.

4. The map points-of-change detection device according to claim 1, wherein:
the collation processing section generates a first collation region by combining a plurality of frames captured by the camera;
the collation processing section starts from the first collation region, creation of the correlation value map by the correlation value map creation section and determination of the matching position by the matching position determination section;
the collation processing section determines a partial region from the collation region in response to that a total number of frames included in one of the collation regions is greater than a total number of final frames after the determination of the matching position by the matching position determination section; and
the collation processing section repeats the creation of the correlation value map by the correlation value map creation section and the determination of the matching position by the matching position determination section until a total number of frames included in the collation region reaches the number of the final frames by setting the determined partial region as the collation region.

5. The map points-of-change detection device according to claim 1, further comprising:
a distortion correction processing section that performs distortion correction and volume distortion correction on the image captured by the camera;
a vanishing point detection section that detects a vanishing point from the image which has been corrected by the distortion correction processing section; and
a camera orientation detection section that detects an orientation of an optical axis of the camera based on a difference between the vanishing point detected by the vanishing point detection section and a position of an image center,
wherein,
the bird's-eye-view transformation section transforms the image captured by the camera into the bird's-eye view image by transforming the orientation of the optical axis of the camera detected by the camera orientation detection section into downward from upward.

6. The map points-of-change detection device according to claim 5, further comprising:
an amount of movement calculation section that sequentially determines a vanishing point region image which is a part of the image that has been corrected by the distortion correction processing section and which is an image of a region determined based on the vanishing point detected by the vanishing point detection section, and calculates an amount of movement for moving a latter vanishing point region image in a vertical direction with respect to a former vanishing point region image when temporally consecutive two of the vanishing point region images are matched;
an integration value calculation section that calculates a positional deviation integration value, which is an integration value of the amount of movement of the image in the vertical direction, the amount of movement being calculated by the amount of movement calculation section; and
an amount of pitch variation calculation section that sequentially calculates a moving average value of the positional deviation integration value calculated by the integration value calculation section, and calculates an amount of pitch variation which is a difference between the moving average value and the amount of movement calculated by the amount of movement calculation section,
wherein,
the camera orientation detection section detects the orientation of the optical axis of the camera based on a difference between the vanishing point detected by the vanishing point detection section and the position of the image center and the amount of pitch variation.

7. The map points-of-change detection device according to claim 1, further comprising:
a vehicle position detection section that detects a position of the vehicle; and
a map generation section that generates a map from the bird's-eye view image by setting a map image determined based on the bird's-eye view image as the map image at the position of the vehicle when the image from which the bird's-eye view image is generated is captured.

8. A map points-of-change detection device comprising:
a camera that is configured to capture an image of an area around a vehicle, the camera being provided in the vehicle;
a bird's-eye-view transformation section that is configured to transform the image captured by the camera into a bird's-eye view image;
a map storage portion that is configured to store a road map including a road surface map;
a collation processing section that is configured to determine whether a point of change in the road surface map exits by collating the bird's-eye view image with the road surface map, the point of change being a position at which a change has occurred on an actual road surface;
a collation region identification section that is configured to determine a region for collation in a width direction of the vehicle from the bird's-eye view image based on a total number of traffic lane lines detected from the bird's-eye view image;
a distortion correction processing section that performs distortion correction and volume distortion correction on the image captured by the camera;
a vanishing point detection section that detects a vanishing point from the image which has been corrected by the distortion correction processing section;
a camera orientation detection section that detects an orientation of an optical axis of the camera based on a difference between the vanishing point detected by the vanishing point detection section and a position of an image center;
an amount of movement calculation section that sequentially determines a vanishing point region image which is a part of the image that has been corrected by the distortion correction processing section and which is an image of a region determined based on the vanishing point detected by the vanishing point detection section, and calculates an amount of movement for moving a latter vanishing point region image in a vertical direction with respect to a former vanishing point region image when temporally consecutive two of the vanishing point region images are matched;

an integration value calculation section that calculates a positional deviation integration value, which is an integration value of the amount of movement of the image in the vertical direction, the amount of movement being calculated by the amount of movement calculation section; and an amount of pitch variation calculation section that sequentially calculates a moving average value of the positional deviation integration value calculated by the integration value calculation section, and calculates an amount of pitch variation which is a difference between the moving average value and the amount of movement calculated by the amount of movement calculation section, wherein the bird's-eye-view transformation section transforms the image captured by the camera into the bird's-eye view image by transforming the orientation of the optical axis of the camera detected by the camera orientation detection section into downward from upward, and the camera orientation detection section detects the orientation of the optical axis of the camera based on a difference between the vanishing point detected by the vanishing point detection section and the position of the image center and the amount of pitch variation.

9. The map points-of-change detection device according to claim 8, further comprising:

an obstacle removal processing section that, with respect to the bird's-eye view image,
designates color of an object included in the road surface map, and
converts at least one color other than the designated color into black, causing an obstacle included in the bird's-eye view image to be removed,
wherein,
the collation processing section collates the bird's-eye view image from which the obstacle has been removed with the road surface map.

10. The map points-of-change detection device according to claim 8, wherein, the collation processing section performs distance transformation on the road surface map, and collates the road surface map after performing the distance transformation with the bird's-eye view image.

11. The map points-of-change detection device according to claim 9, wherein:

the collation region identification section extracts a collation region for performing collation from the bird's-eye view image to be used for the collation based on a total number of traffic lane lines detected from the bird's-eye view image;
the collation region identification section identifies as a matching target region, a predetermined region from the road surface map, the predetermined region being determined based on a current position of the vehicle;
the collation processing section further comprising
a correlation value map creation section that calculates a correlation value of the collation region in the bird's-eye view image to be used for the collation with respect to the matching target region in the road surface map while changing positions of the collation region, and creates a correlation value map that indicates a relation between the correlation value and a relative position of the collation region with respect to the matching target region, and
a matching position determination section that calculates, for each position of the collation region with respect to the matching target region, a score obtained by multiplying a scoring map in which a coefficient is highest at a current position due to highest likelihood and the coefficient decreases with distance from the current position by the correlation value map, and determines a position of the collation region having highest score as a matching position; and the collation processing section collates the bird's-eye view image for the collation with the road surface map in the road map by setting the position of the collation region as the matching position.

12. The map points-of-change detection device according to claim 11, wherein:
the collation processing section generates a first collation region by combining a plurality of frames captured by the camera;
the collation processing section starts from the first collation region, creation of the correlation value map by the correlation value map creation section and determination of the matching position by the matching position determination section;
the collation processing section determines a partial region from the collation region in response to that a total number of frames included in one of the collation regions is greater than a total number of final frames after the determination of the matching position by the matching position determination section; and
the collation processing section repeats the creation of the correlation value map by the correlation value map creation section and the determination of the matching position by the matching position determination section until a total number of frames included in the collation region reaches the number of the final frames by setting the determined partial region as the collation region.

13. The map points-of-change detection device according to claim 8, further comprising:
a vehicle position detection section that detects a position of the vehicle; and
a map generation section that generates a map from the bird's-eye view image by setting a map image determined based on the bird's-eye view image as the map image at the position of the vehicle when the image from which the bird's-eye view image is generated is captured.

* * * * *